US009418245B2

(12) United States Patent
Shibutani et al.

(10) Patent No.: US 9,418,245 B2
(45) Date of Patent: Aug. 16, 2016

(54) ENCRYPTION PROCESSING DEVICE, ENCRYPTION PROCESSING METHOD, AND PROGRAM

(75) Inventors: Kyoji Shibutani, Tokyo (JP); Toru Akishita, Tokyo (JP); Takanori Isobe, Tokyo (JP); Taizo Shirai, Kanagawa (JP); Harunaga Hiwatari, Kanagawa (JP); Atsushi Mitsuda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 124 days.

(21) Appl. No.: 14/002,379

(22) PCT Filed: Feb. 20, 2012

(86) PCT No.: PCT/JP2012/053931

§ 371 (c)(1),
(2), (4) Date: Aug. 30, 2013

(87) PCT Pub. No.: WO2012/132621

PCT Pub. Date: Oct. 4, 2012

(65) Prior Publication Data

US 2013/0339753 A1 Dec. 19, 2013

(30) Foreign Application Priority Data

Mar. 28, 2011 (JP) .................................. 2011-069183
Sep. 22, 2011 (JP) .................................. 2011-207703

(51) Int. Cl.
*G06F 21/72* (2013.01)
*H04L 9/06* (2006.01)
*G09C 1/00* (2006.01)

(52) U.S. Cl.
CPC *G06F 21/72* (2013.01); *G09C 1/00* (2013.01); *H04L 9/0625* (2013.01); *H04L 9/0631* (2013.01); *H04L 2209/122* (2013.01)

(58) Field of Classification Search
CPC ......... G06F 21/72; G09C 1/00; H04L 9/0631; H04L 9/0625; H04L 2209/122
See application file for complete search history.

(56) References Cited

U.S. PATENT DOCUMENTS 5,512,977 A * 4/1996 Imai .............................. 399/366
6,215,875 B1 * 4/2001 Nohda ........................... 380/202

(Continued)

OTHER PUBLICATIONS

Wei, et al., "Impossible Differential Cryptanalysis on Feistel Ciphers with SP and SPS Round Functions", Applied Cryptography and Network Security, lecture notes from the 8th International Conference, ACNS 2010, Beijing, China, Jun. 22-25, 2010.*

(Continued)

*Primary Examiner* — Joseph P Hirl
*Assistant Examiner* — J. Brant Murphy
(74) *Attorney, Agent, or Firm* — Chip Law Group

(57) ABSTRACT

Included is an encryption processing unit configured to divide and input configuration bits of data to be data processed into a plurality of lines, and to repeatedly execute data conversion processing of data for each line. The encryption processing unit includes an F function execution unit to input data from one line configuring the plurality of lines and generate converted data, an XOR calculation unit to execute an XOR calculation with other lines of data corresponding to the output from the F function, an intermediate data storage register to store intermediate data during the process of generating converted data in the F function execution unit, and an inverse calculation executing unit to calculate input data regarding the F function execution unit on the basis of the data stored in the intermediate storage register.

10 Claims, 32 Drawing Sheets

(56) References Cited

U.S. PATENT DOCUMENTS

| | | | |
|---|---|---|---|
| 8,073,140 B2 | 12/2011 | Shirai et al. | |
| 8,695,106 B2* | 4/2014 | Spalka et al. | 726/30 |
| 2002/0012430 A1* | 1/2002 | Lim | 380/29 |
| 2003/0059044 A1* | 3/2003 | Shimizu et al. | 380/37 |
| 2003/0138098 A1* | 7/2003 | Cole | H04L 9/0625 380/28 |
| 2004/0008841 A1* | 1/2004 | Aoki et al. | 380/42 |
| 2005/0055596 A1* | 3/2005 | Abe et al. | 713/500 |
| 2005/0226407 A1* | 10/2005 | Kasuya et al. | 380/28 |
| 2007/0194957 A1* | 8/2007 | Watanabe | 341/106 |
| 2009/0010425 A1 | 1/2009 | Shibutani et al. | |
| 2009/0113214 A1* | 4/2009 | Dolgunov et al. | 713/189 |
| 2010/0014659 A1* | 1/2010 | Shibutani et al. | 380/28 |
| 2010/0061548 A1* | 3/2010 | Shirai et al. | 380/28 |
| 2010/0091991 A1* | 4/2010 | Shibutani et al. | 380/259 |
| 2010/0104093 A1* | 4/2010 | Shirai et al. | 380/28 |
| 2010/0226493 A1* | 9/2010 | Shirai et al. | 380/28 |
| 2011/0004738 A1* | 1/2011 | Yasaki et al. | 711/166 |
| 2011/0154025 A1* | 6/2011 | Spalka et al. | 713/156 |
| 2011/0185188 A1* | 7/2011 | Spalka et al. | 713/189 |

OTHER PUBLICATIONS

Extended European Search Report issued Jul. 28, 2014 in Patent Application No. 12765336.8.

Ramesh Karri, et al., "Concurrent Error Detection of Fault-Based Side-Channel Cryptanalysis of 128-Bit Symmetric Block Ciphers", Proceedings of the 38th Annual Design Automation Conference, (DAC), vol. CONF. 38, XP010552454, (Jun. 18-22, 2001), pp. 579-584.

Ramesh Karri, et al., "Fault-Based Side-Channel Cryptanalysis Tolerant Rijndael Symmetric Block Cipher Architecture", Proceedings 2001 IEEE International Symposium on Defect and Fault Tolerance in VLSI Systems, XP055008477, (Jan. 1, 2001), pp. 427-435.

U.S. Appl. No. 12/161,898, filed Jul. 23, 2008, Shibutani et al.
U.S. Appl. No. 14/005,3663, filed Sep. 17, 2013, Shibutani et al.
U.S. Appl. No. 14/006,392, filed Sep. 20, 2013, Shibutani et al.
U.S. Appl. No. 14/002,462, filed Aug. 30, 2013, Shibutani et al.
U.S. Appl. No. 14/278,632, filed May 15, 2014, Shirai et al.
International Search Report issued Mar. 27, 2012 in PCT/JP2012/053931.

Ramesh Karri, et al. "Concurrent Error Detection Schemes for Fault-Based Side-Channel Cryptanalysis of Symmetric Block Ciphers" IEEE Transactions on Computer-Aided Design of Integrated Circuits and Systems, vol. 21, No. 12, Dec. 16, 2002, pp. 1509-1517 (with Abstract and bibliographic data).

Panu Hamalainen, et al. "Design and Implementation of Low-area and Low-power AES Encryption Hardware Core" $9^{th}$ Euromicro Conference on Digital Systems Design, Oct. 16, 2006, 7 Pages.

Takeshi Sugawara, et al. "High-performance ASIC Implementations of the 128-bit Block Cipher CLEFIA" IEEE International Symposium on Circuits and Systems, Jun. 13, 2008, pp. 2925-2928 (with Abstract and bibliographic data).

Toru Akishita, et al. "128 Compact Hardware Implementations of the 128-bit Blockcipher CLEFIA" 2011 Nen Symposium on Cryptography and Information Security Koen Ronbunshu, Jan. 25, 2011, pp. 1-7.

Kyoji Shibutani, et al. "Piccolo: An Ultra-Lightweight Blockcipher" Lecture Noted in Computer Science, Cryptographic Hardware and Embedded Systems—CHES 2011, Sep. 27, 2011, 19 Pages.

Kaisa Nyberg, "Generalized Feistel Networks" Advances in Cryptology—ASIACRYPT, vol. 1163, 1996, pp. 91-104.

Yuliang Zheng, "On the Construction of Block Ciphers Provably Secure and Not Relying on Any Unproved Hypothesis, (Extended Abstract)" Springer-Verlag, 1998, pp. 461-480.

\* cited by examiner

ENCRYPTION PROCESSING DEVICE, ENCRYPTION PROCESSING METHOD, AND PROGRAM

TECHNICAL FIELD

The present disclosure relates to an encryption processing device, an encryption processing method, and a program. More specifically, this relates to an encryption processing device, an encryption processing method, and a program for executing shared key encryption.

BACKGROUND ART

As the information society continues to develop, the necessity of information security technologies for securely protecting information used increases. One configuration element of information security technologies are encryption technologies, and encryption technologies are currently used by various products and systems.

Though there are various types of encryption processing algorithms, one of the basic technologies is called a shared key block encryption. According to the shared key block encryption, a key for encryption and a key for decryption are shared items. In both the encryption processing and the decryption processing, multiple keys are generated from these shared keys, and a data conversion processing is repeatedly executed in block data units of a certain block unit such as 64 bits, 128 bits, 256 bits, or other.

DES (Data Encryption Standard), which was the previous US standard, and AES (Advanced Encryption Standard), which is the current US standard, are known as representative shared key block encryption algorithms. Other various shared key block encryptions continue to be proposed, and the CLEFIA proposed by Sony Corporation in 2007 is also a shared key block encryption.

These kind of shared key block encryption algorithms are mainly configured with an encryption processing unit including a round function execution unit for repeatedly executing conversions of input data, and a key scheduling unit for generating round keys to be applied at each round regarding the round function unit. The key scheduling unit first generates an expanded key in which the bit count is increased on the basis of a master key (master key), which is a secret key, and generates round keys (secondary keys) to be applied at each round function unit regarding the encryption processing unit, based on the generated expanded key.

Configurations for repeatedly executing the round function including linear conversion units and non-linear conversion units are known as specific configurations of these kinds of algorithms. Representative structures include the Feistel structure and the expanded Feistel structure, for example. The Feistel structure and the expanded Feistel structure include structures that convert plaintext into ciphertext by the repetition of a simple round function including an F function as a data conversion function. The linear conversion processing and the non-linear conversion processing are executed by the F function. Further, NPL 1 and NPL 2 are examples of literature which discloses encryption processing applying the Feistel structure and the expanded Feistel structure.

There are two types of embodiments of encryption algorithms, software implementations and hardware implementations. With hardware implementations, costs can be reduced and low energy consumption can be expected when implementing as hardware by designing the implementation so that the circuit scale is as small as possible. For this reason, regardless of whether new algorithms or existing algorithms, various implementation methods for miniaturization have been proposed.

For example, a miniaturization method corresponding to an AES encryption having a Substitution Permutation Network (SPN) structure is proposed by Hamalainen, Alho, Hannikainen, Hamalainen, et al. Details about this miniaturization method are disclosed in NPL 3 "Panu Hamalainen, Timo Alho, Marko Hannikainen, and Timo D. Hamalainen. Design and implementation of low-area and low-power AES encryption hardware core. In DSD, pages 577-583. IEEE Computer Society, 2006. 9".

According to this disclosed implementation method, miniaturization of the circuit scale is achieved by processing AES 128-bit block encryption in calculation units of every 8 bits. The implementation method from Hamalainen, et al. can also be applied to CLEFIA and others having an expanded Feistel structure, which is different from the SPN structure.

However, if the existing technique is applied simplistically, in addition to block length worth of registers, registers necessary for storing intermediate values of F function calculations in the non-linear processing unit increase. For example, when considering an application into CLEFIA, in addition to 128 bits worth of block length registers, 32 bits worth of registers also increase.

CITATION LIST

Non Patent Literature

NPL 1: K. Nyberg, "Generalized Feistel Networks", ASIACRYPT '96, SpringerVerlag, 1996, pp. 91-104.

NPL 2: Yuliang Zheng, Tsutomu Matsumoto, Hideki Imai: On the Construction of Block Ciphers Provably Secure and Not Relying on Any Unproved Hypotheses. CRYPTO 1989: 461-480.

NPL 3: Panu Hamalainen, Timo Alho, Marko Hannikainen, and Timo D. Hamalainen. Design and implementation of low-area and low-power AES encryption hardware core. In DSD, pages 577-583. IEEE Computer Society, 2006. 9.

SUMMARY OF INVENTION

Technical Problem

The present disclosure is the result of considering the previously described situation, for example, and aims to provide an encryption processing device, an encryption processing method, and a program that can achieve a hardware configuration in which a miniaturization smaller than that of the existing technique can be expected regarding encryption algorithms having expanded Feistel structures such as CLEFIA, for example.

Solution to Problem

Specifically, an implementation method in which registers other than that for the block length are not required is achieved by inserting a circuit to decode the input into the F function from the intermediate values of an F function currently in calculation, for example. As a result, miniaturization of the circuit scale can be expected due to the result in the reductions of registers by this structure.

Solution to Problem

A first aspect of the present disclosure is an encryption processing device including:

an encryption processing unit configured to divide and input configuration bits of data to be data processed into a plurality of lines, and to repeatedly execute data conversion processing of data for each line;

wherein the encryption processing unit includes an F function execution unit to input data from one line configuring the plurality of lines, an XOR calculation unit to execute an XOR calculation with other lines of data corresponding to the output from the F function, an intermediate data storage register to store intermediate data during the process of generating converted data in the F function execution unit, and an inverse calculation executing unit to calculate input data regarding the F function execution unit on the basis of the data stored in the intermediate storage register.

Further, regarding an embodiment of the encryption processing device according to the present disclosure, the F function execution unit includes an S-box to execute non-linear conversion processing of input data for the F function execution unit, the intermediate data storage register stores the output value from the S-box as the intermediate data, and the inverse calculation executing unit calculates the input data for the F function execution unit by a calculation processing including an inverse calculation of the non-linear conversion processing via the S-box.

Further, regarding an embodiment of the encryption processing device according to the present disclosure, the F function execution unit includes a non-linear conversion unit and a linear conversion unit, includes a register to store the output from the non-linear conversion unit as the intermediate data, the linear conversion unit executes linear conversion processing on the values stored in the register, and the inverse calculation unit calculates the input data for the F function by a calculation processing on the values stored in the register.

Further, regarding an embodiment of the encryption processing device according to the present disclosure, the F function execution unit executes non-linear conversion processing in the non-linear conversion unit on input corresponding to the F function execution unit, and further is an SP type of F function to execute the linear conversion processing in the linear conversion unit.

Further, regarding an embodiment of the encryption processing device according to the present disclosure, the F function execution unit executes non-linear conversion processing in the non-linear conversion unit on input corresponding to the F function execution unit, and further is an SPS type of F function to execute the linear conversion processing in the linear conversion unit.

Further, regarding an embodiment of the encryption processing device according to the present disclosure, the F function execution unit includes an XOR calculation unit with the round key input externally.

Further, regarding an embodiment of the encryption processing device according to the present disclosure, the F function execution unit includes a repeating structure of a plurality of non-linear calculation units.

Further, regarding an embodiment of the encryption processing device according to the present disclosure, the encryption processing unit executes encryption processing to convert plaintext as the input data into ciphertext, and executes decryption processing to convert ciphertext as the input data into plaintext.

Further, a second aspect of the present disclosure is an encryption processing method to be executed in an encryption processing device, the encryption processing method including:

an encryption processing step in which an encryption processing unit is configured to divide and input configuration bits of data to be data processed into a plurality of lines, and to repeatedly execute data conversion processing of data for each line;

wherein the encryption processing step includes an F function execution step to input data from one line configuring the plurality of lines and generate converted data, an XOR calculation step to execute an XOR calculation with other lines of data corresponding to the output from the F function, a step to store intermediate data intermediate data in an intermediate data storage register during the process of generating converted data in the F function execution unit, and an inverse calculation executing step to calculate input data regarding the F function execution unit on the basis of the data stored in the intermediate storage register.

Further, a third aspect of the present disclosure is a program to execute encryption processing in an encryption processing device, the program including:

an encryption processing step in which an encryption processing unit is configured to divide and input configuration bits of data to be data processed into a plurality of lines, and to repeatedly execute data conversion processing of data for each line;

wherein the encryption processing step includes an F function execution step to input data from one line configuring the plurality of lines and generate converted data, an XOR calculation step to execute an XOR calculation with other lines of data corresponding to the output from the F function, a step to store intermediate data intermediate data in an intermediate data storage register during the process of generating converted data in the F function execution unit, and an inverse calculation executing step to calculate input data regarding the F function execution unit on the basis of the data stored in the intermediate storage register.

Further, the program according to the present disclosure is a program supplied to a computer system or information processing device capable of executing various program code, for example, by a recording medium, for example. The processing is achieved through the program by executing this kind of program with program executing unit in the information processing device or computer system.

Other objects, features, and advantages of the present disclosure will become clear by the detailed descriptions based on the embodiments of the present invention described later and the attached drawings. Further, the system regarding the present specification is a logical combination configuration of multiple devices, and so each configuration of the devices is not limited to being housed within the same physical unit.

Advantageous Effects of Invention

According to the embodiments of the present disclosure, miniaturization of the encryption processing configuration is achieved.

Specifically, included is an encryption processing unit configured to divide and input configuration bits of data to be data processed into a plurality of lines, and to repeatedly execute data conversion processing of data for each line, wherein the encryption processing unit includes an F function execution unit to input data from one line configuring the plurality of lines, an XOR calculation unit to execute an XOR calculation with other lines of data corresponding to the output from the F function, an intermediate data storage register to store intermediate data during the process of generating converted data in the F function execution unit, and an inverse calculation executing unit to calculate input data regarding the F function execution unit on the basis of the data stored in the intermediate storage register. The input values for the F function execution unit are calculable by the inverse calculation in the inverse calculation executing unit, which enables reduction in registers for storing this data, and so miniaturization of the encryption processing configuration is achieved.

DESCRIPTION OF EMBODIMENTS

Hereafter, an encryption processing device, an encryption processing method, and a program related to the present disclosure will be described in detail with reference to the drawings. The description will occur according to the following items.

1. Shared Key Block Encryption Overview
2. Overview of Shared Key Block Encryption Structures and Miniaturization Implementation Methods According to the Related Art
3. Example of Encryption Processing Configurations Achieving Reductions in Registers
4. Summary of the Advantages of the Technique According to the Present Disclosure
5. Other Embodiments
6. Configuration Examples of Encryption Processing Devices
7. Conclusion Regarding Configuration of the Present Disclosure 1. Shared Key Block Encryption Overview First, an overview of shared key block encryption will be described.

(1-1. Shared Key Block Encryption)

The following definition specifies that which designates shared key block encryption here (hereafter, block encryption).

Block encryption obtains a plaintext P and a key K as input, and outputs a ciphertext C. The bit length of the plaintext and the ciphertext is called a block size, which is written as n. n is an arbitrary integer value that is normally one value determined beforehand for each block encryption algorithm. This case in which the block length is an n block encryption is sometimes called an n-bit block encryption.

The bit length of the key is expressed as k. The key has an arbitrary integer value. The shared key block encryption algorithm can support one or multiple key sizes. For example, for some block encryption algorithm A, the block size is n=128, and so a configuration is possible which supports a key size of k=128, k=192, or k=256.

Plaintext P: n bits
Ciphertext C: n bits
Key K: k bits

Figure 1:
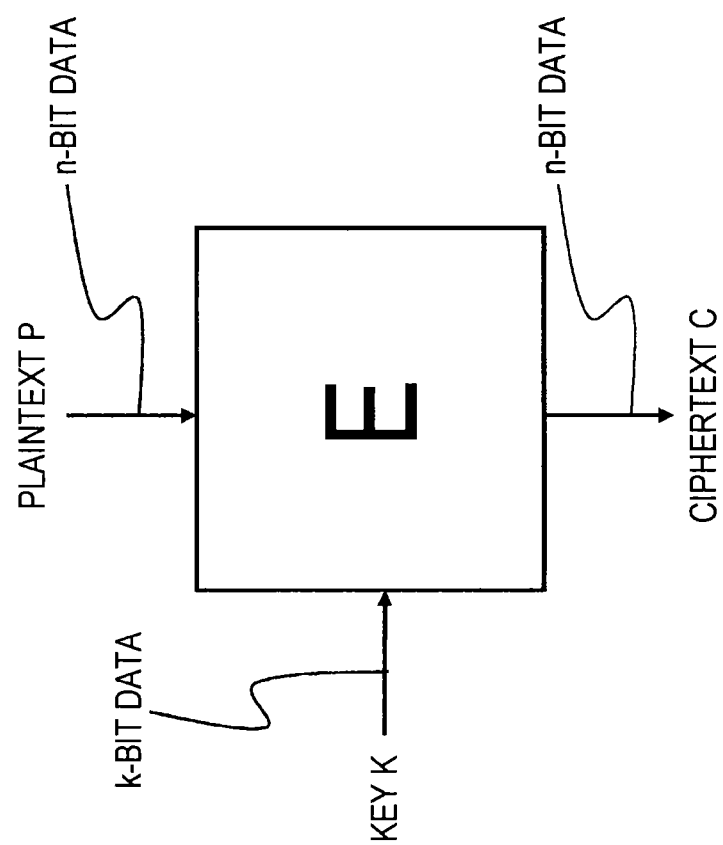
FIG. 1 is a diagram describing an n-bit shared key block encryption algorithm corresponding to a key length of k bits.

FIG. 1 illustrates a diagram of an n-bit shared key block encryption algorithm E corresponding to a key length of k bits.

Figure 2:
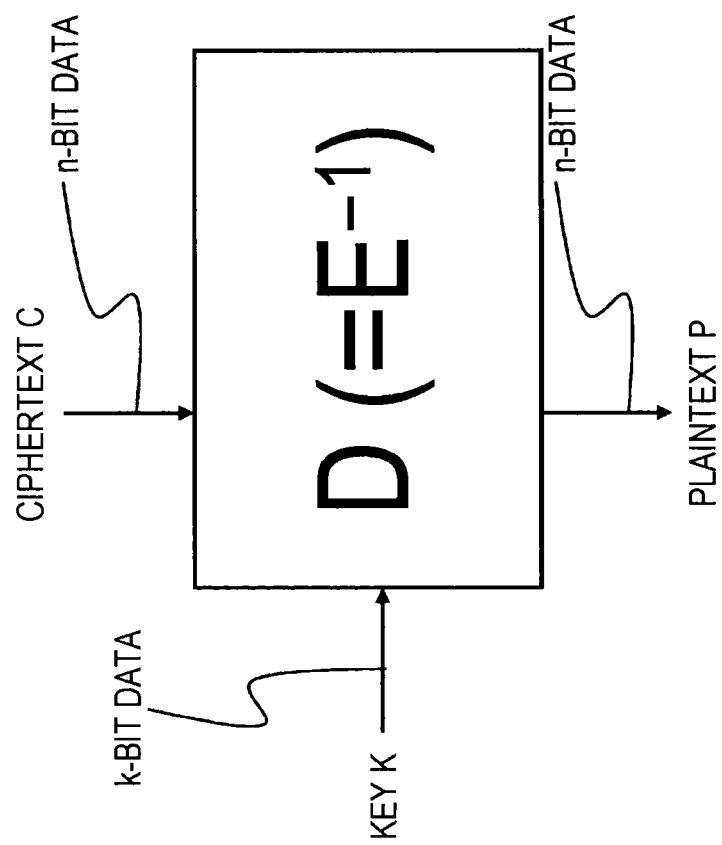
FIG. 2 is a diagram describing a decryption algorithm corresponding to the n-bit shared key block encryption algorithm corresponding to a key length of k bits, illustrated in FIG. 1.

A decryption algorithm D corresponding to the encryption algorithm E can be defined an inverse function $E^{-1}$ of the encryption algorithm E, which receives the ciphertext C and key K as the input, and outputs the plaintext P. FIG. 2 illustrates a diagram of the decryption algorithm D corresponding to the encryption algorithm E illustrated in FIG. 1.

(1-2. Internal Configuration)

The block encryption thought of as a division into two portions. One is a "key scheduling unit" to which the key K is input, and outputs an expanded key K' (bit length k') by expanding the bit length according to certain previously determined steps, and the other is a "data encryption unit" that receives the plaintext P and the key K' expanded from the key scheduling unit, performs a data conversion, and outputs the ciphertext C.

Figure 3:
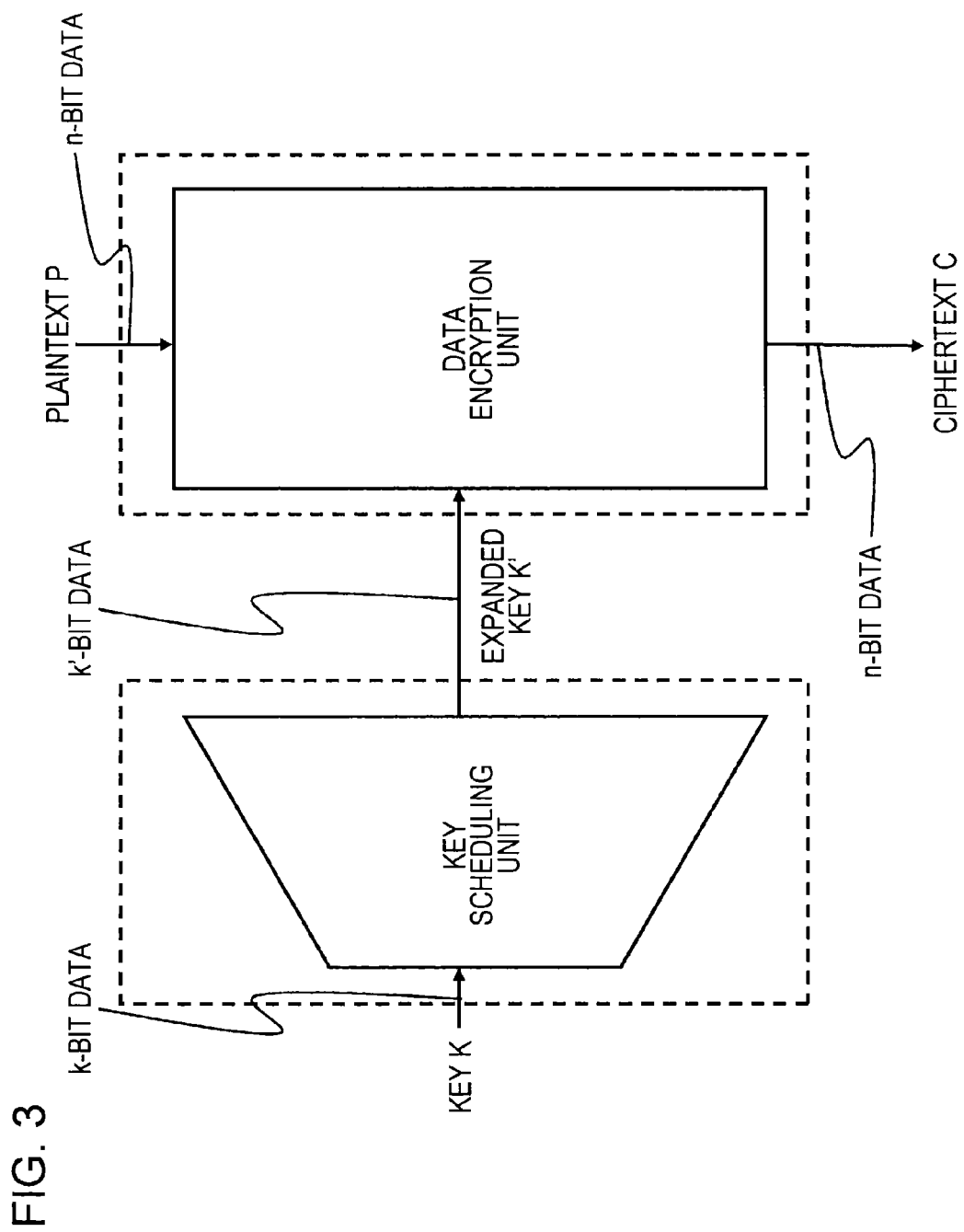
FIG. 3 is a diagram describing a relationship between a key scheduling unit and a data encryption unit.

The relationship between these two portions is illustrated in FIG. 3.

(1-3. Data Encryption Unit)

The data encryption unit used in the following embodiments can be divided into processing units called round functions. The round function receives two units of data as the input, conducts processing internally, and outputs one unit of data. One part of the input data is an n-bit data currently being encrypted, which results in a configuration in which the output from the round function for some round is supplied as the input for the next round. The other part of the input data is used as data for a portion of the expanded key output from the key scheduler, and this key data is called the round key. Also, the total number of round functions is called the total round number, and is a value determined beforehand for each encryption algorithm. Here, the total round number is expressed as R.

Figure 4:
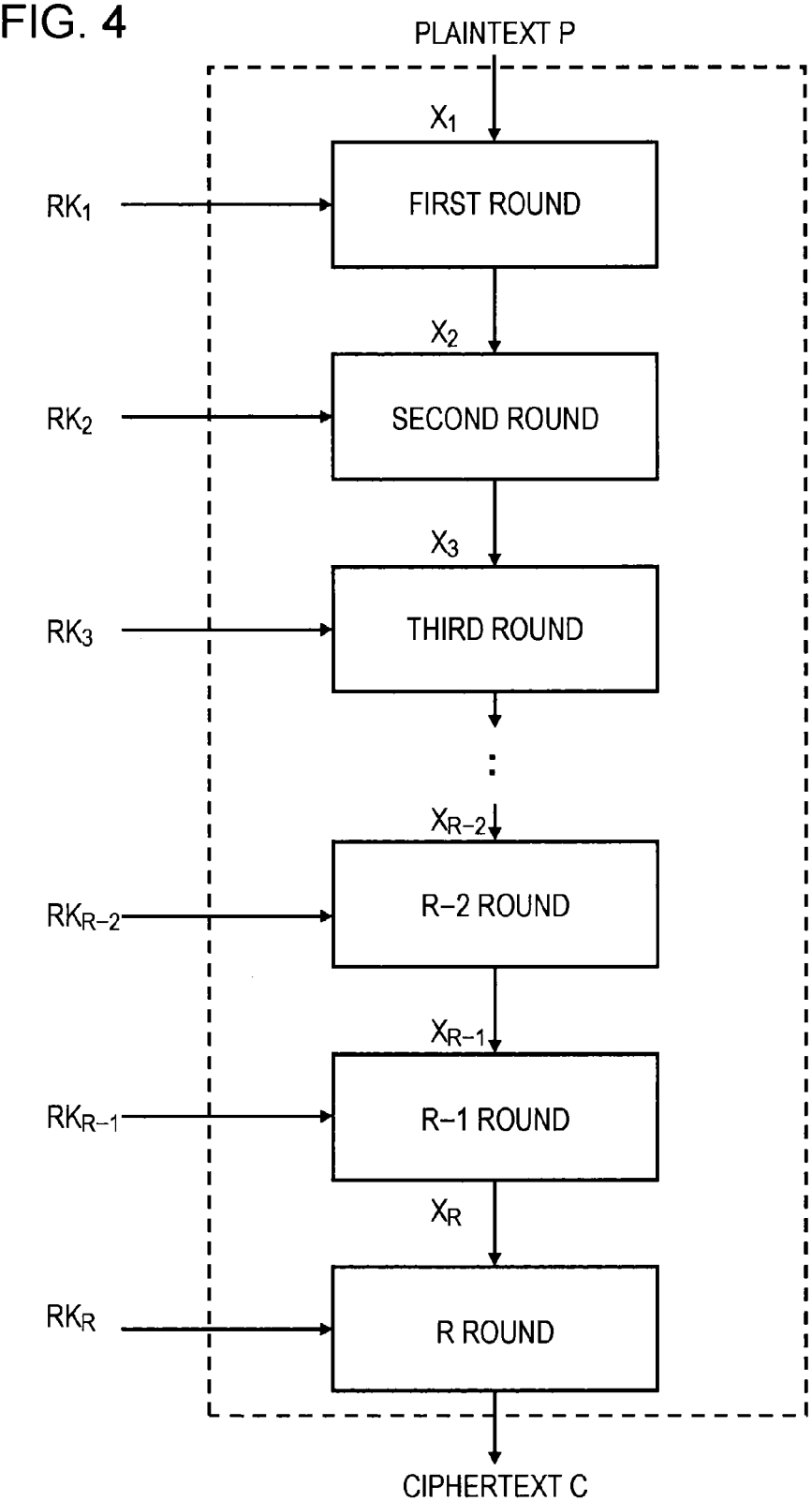
FIG. 4 is a diagram describing an example configuration of the data encryption unit.

An overview of the data encryption unit is illustrated as in FIG. 4 when looking from the input side of the data encryption unit in which the input data for the first round is designated as $X_1$, the data input in the round function for an i number of rounds is designated as $X_i$, and the round key is designated as $RK_i$.

(1-4. Round Function)

The round function can have various forms depending on the block encryption algorithm. The round function can be classified by the structure adopted by this encryption algorithm. Typical structures used here as examples are SPN structures, Feistel structures, and expanded Feistel structures.

(A) SPN Structure Round Function

Figure 5:
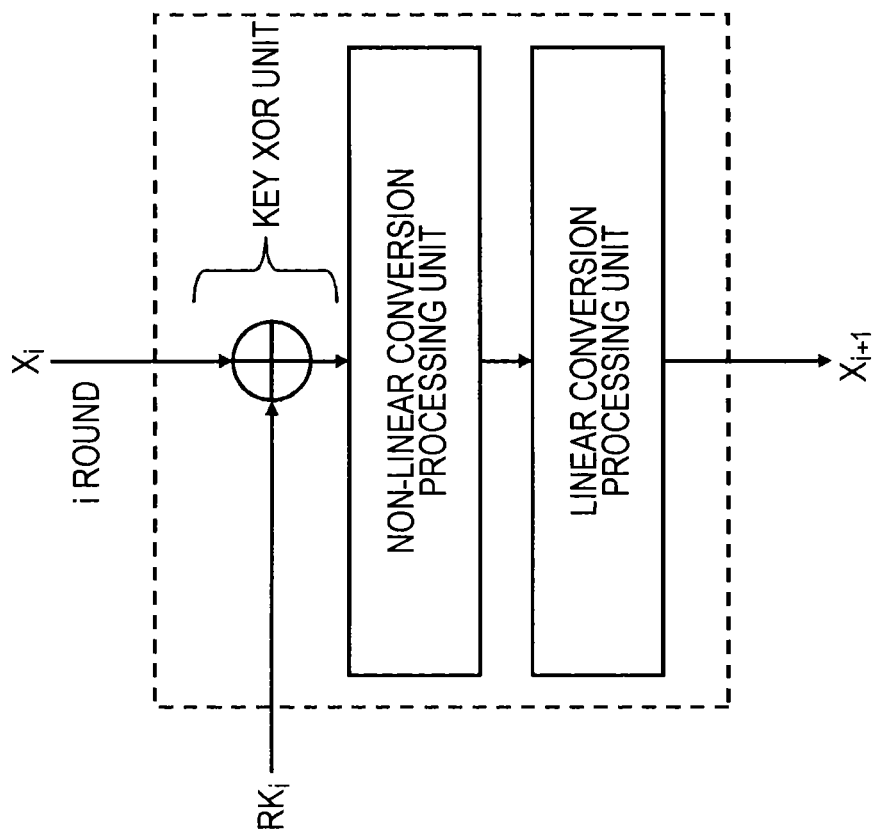
FIG. 5 is a diagram describing an example of an SPN structure round function.

This structure applies linear conversion processing, non-linear conversion, and XOR calculations on the round key and all of the n-bit input data. The order of each calculation is not particularly determined. FIG. 5 illustrates an example of an SPN structure round function.

(B) Feistel Structure

Figure 6:
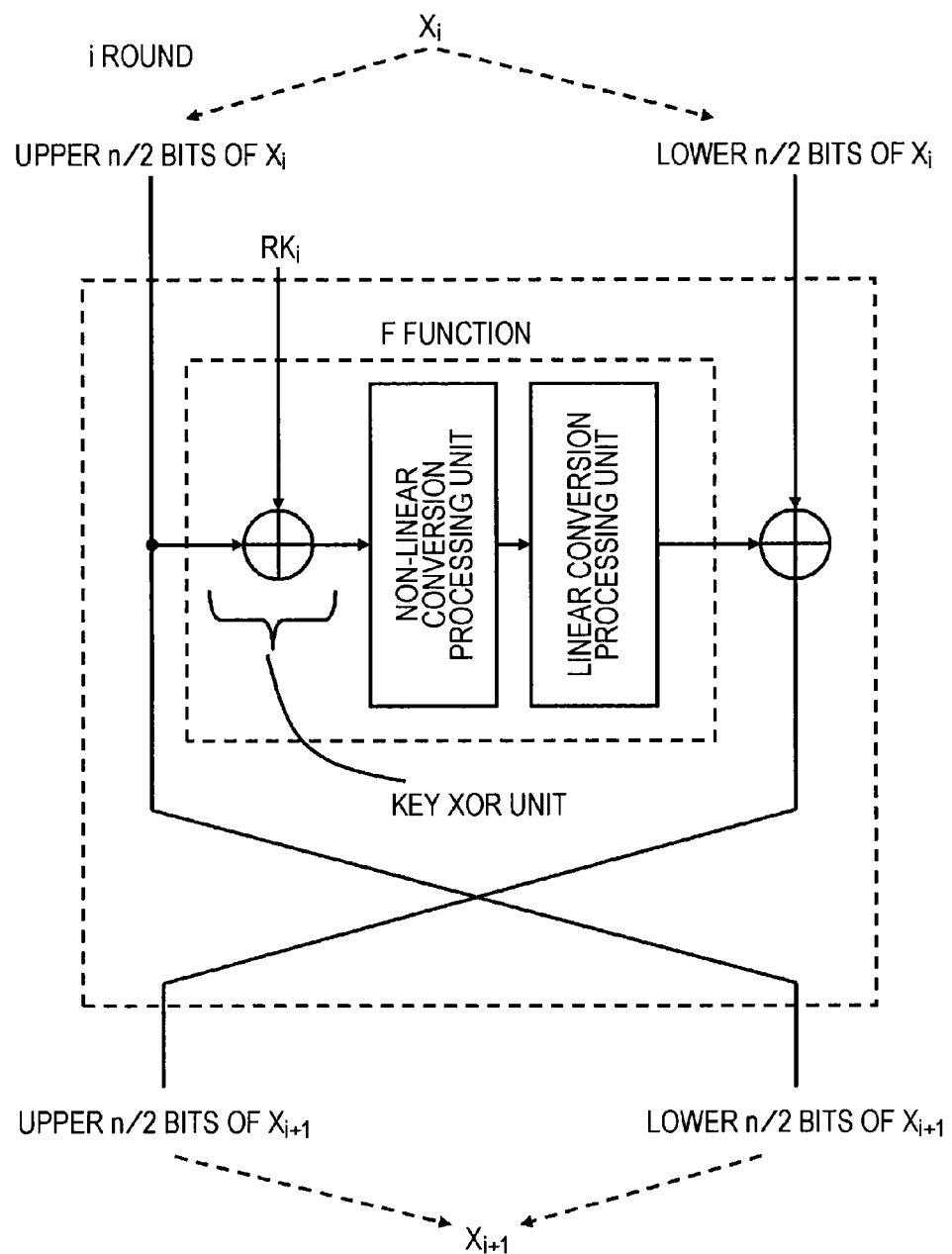
FIG. 6 is a diagram describing an example of a Feistel structure round function.

The n-bit input data is divided into two units of n/2-bit data. A function (F function) is applied with one part of this data and the round key as the input, and the output and the other part of the data is XOR calculated. The result of shuffling both sides of this data becomes the output data. Though there are various types of internal configuration of the F function, but these are basically achieved similarly to the SPN structure with a combination of XOR calculations with the round key data, non-linear calculations, and linear conversions. FIG. 6 illustrates an example of a Feistel structure round function.

(C) Expanded Feistel Structure

Figure 7:
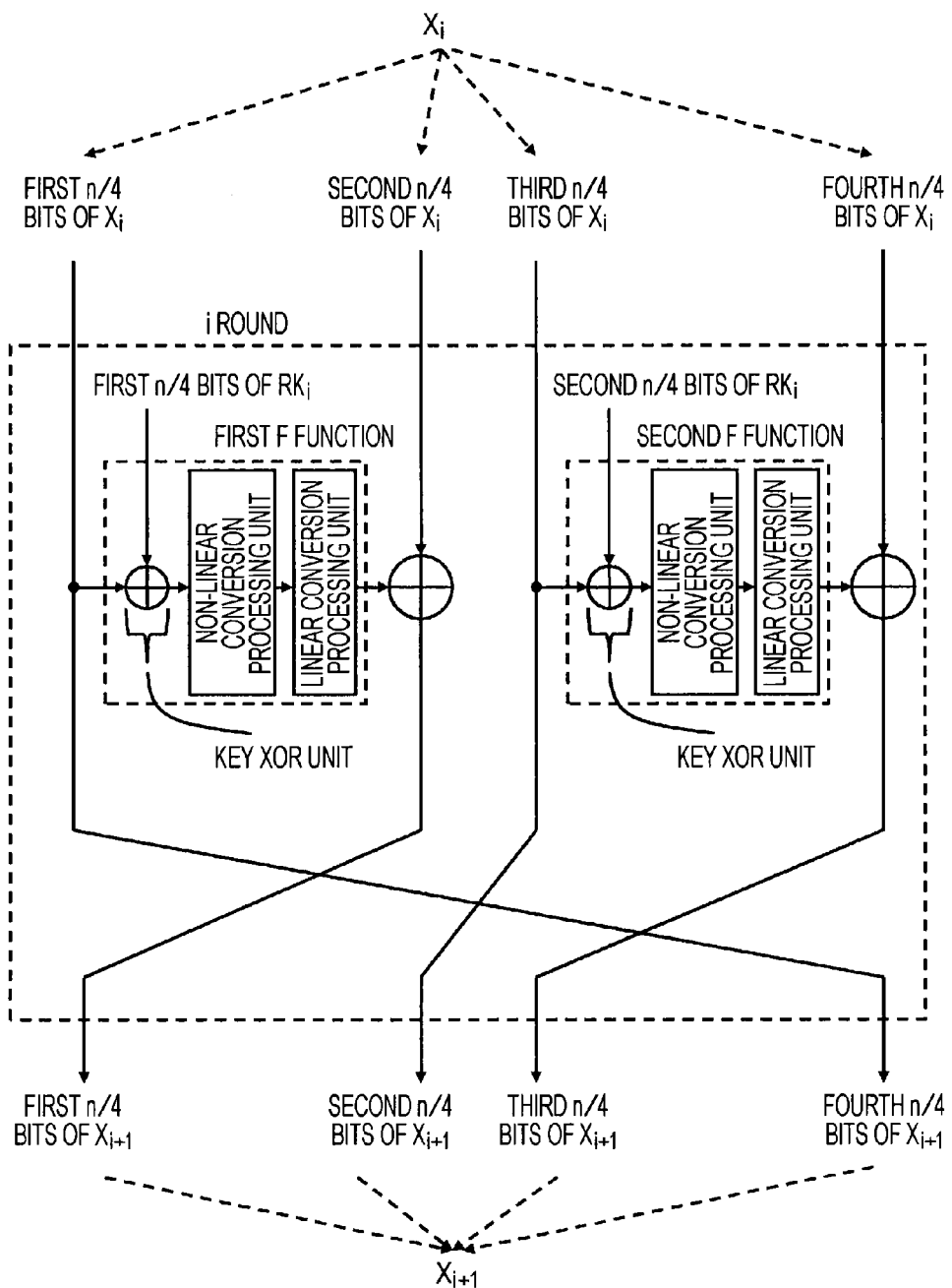
FIG. 7 is a diagram describing an example of an expanded Feistel structure.
Figure 8:
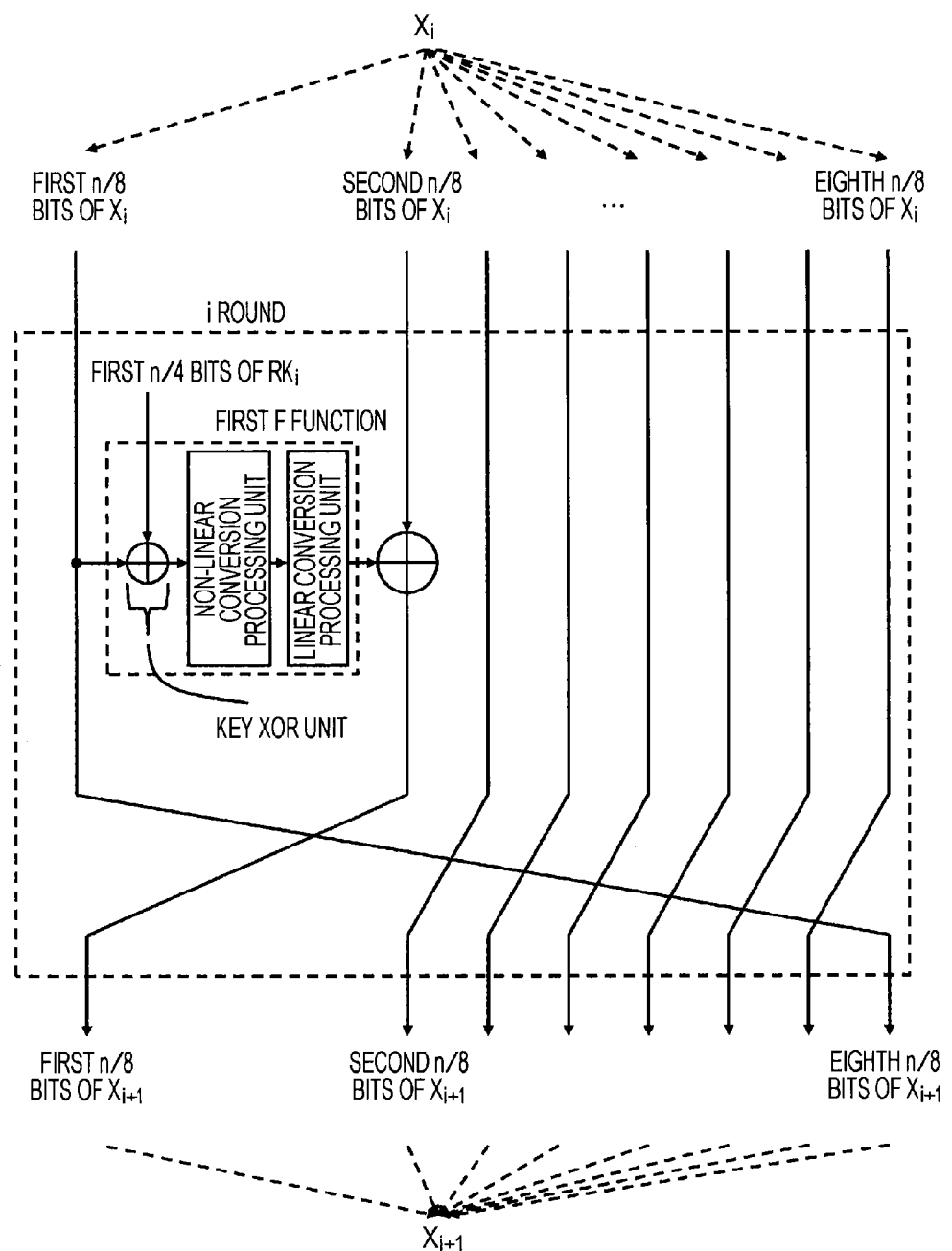
FIG. 8 is a diagram describing an example of an expanded Feistel structure.

The data division number of two regarding the Feistel structure is expanded into a format of three or more divisions with the expanded Feistel structure. If the division number is designated as d, then various expanded Feistel structures can be defined depending on d. As the size if the F function input and output is relatively smaller, this is suited for small implementations. FIG. 7 illustrates an example of an expanded Feistel structure in which d=4, and two F functions are applied in parallel within one round. Also, FIG. 8 illustrates an example of an expanded Feistel structure in which d=8, and one F function is applied within one round.

(1-5. Non-linear Conversion Processing Unit)

Figure 9:
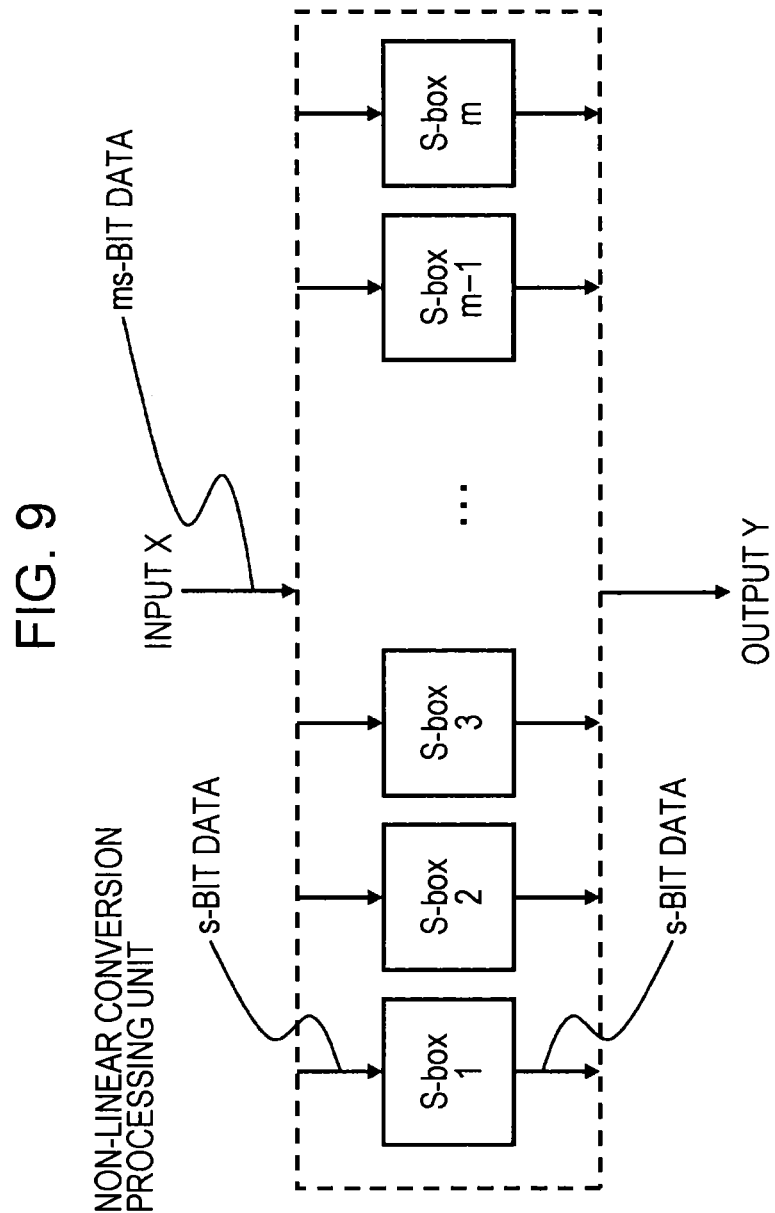
FIG. 9 is a diagram describing an example configuration of a non-linear conversion unit.

The implementation costs tend to increase as the size of the input data increases for non-linear conversion processing units. In order to circumvent this, many configurations are used in which the corresponding data is divided into multiple units, and non-linear conversion is conducted on this data. For example, when the input size is designated as ms bits, these configurations divide an m number of data units every s bits, and perform non-linear conversions on this data in which the input and output is s bits. The non-linear conversions in these s-bit units are called S-boxes. FIG. 9 illustrates an example.

(1-6. Linear Conversion Processing Unit)

Figure 10:
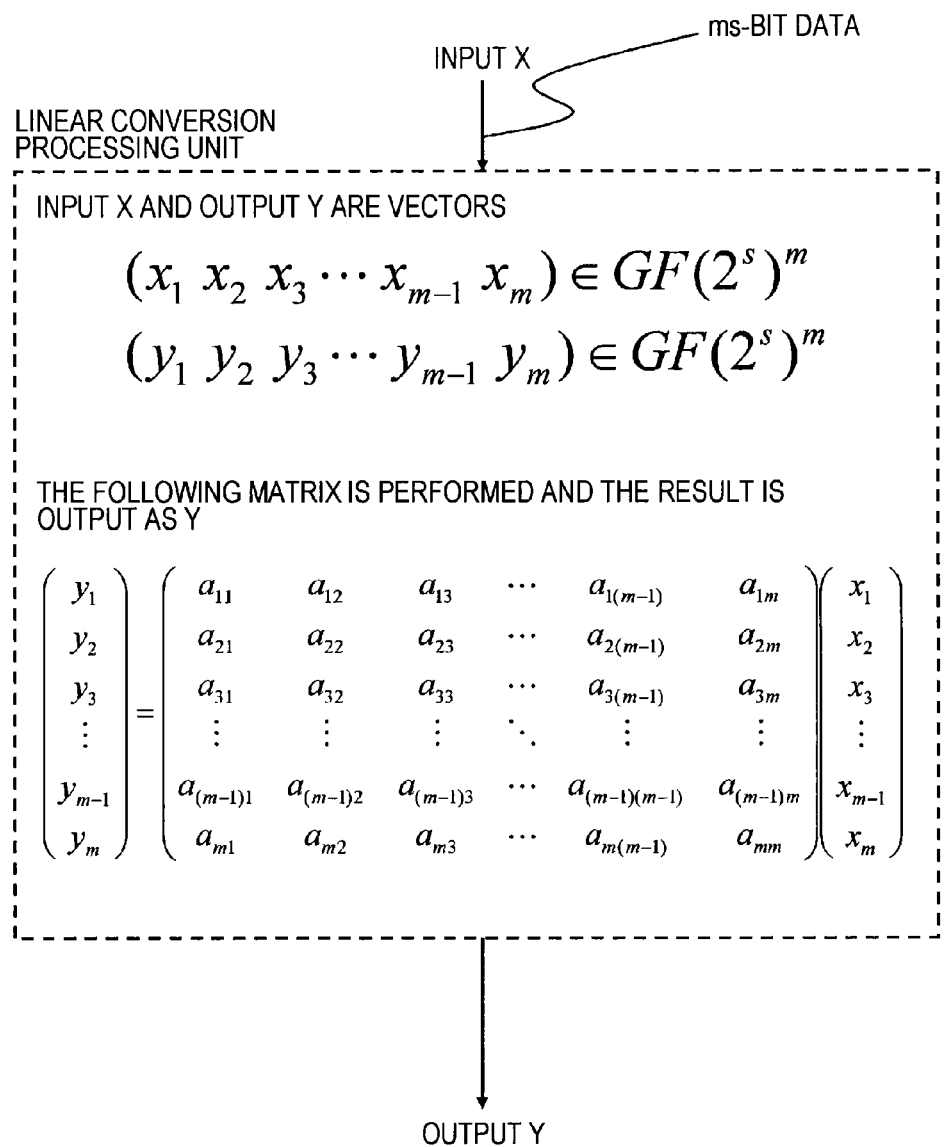
FIG. 10 is a diagram describing an example configuration of a linear conversion processing unit.

Linear conversion processing units can be defined as matrices considering their nature. The elements of the matrix can generally be expressed in various ways such as a body element of GF ($2^8$) and an element of GF (2). FIG. 10 illustrates an example of a linear conversion processing unit defined by a matrix of m×m, which defines the ms-bit input and output as GF ($2^s$).

2. Overview of Shared Key Block Encryption Structures and Miniaturization Implementation Methods According to the Related Art Next, an overview of shared key block encryption structures and miniaturization implementation methods according to the related art will be described.

Necessary terms will be described for the sake of the descriptions regarding the encryption processing configurations related to the present disclosure.

(2-1. Shared Key Block Encryption)

Figure 11:
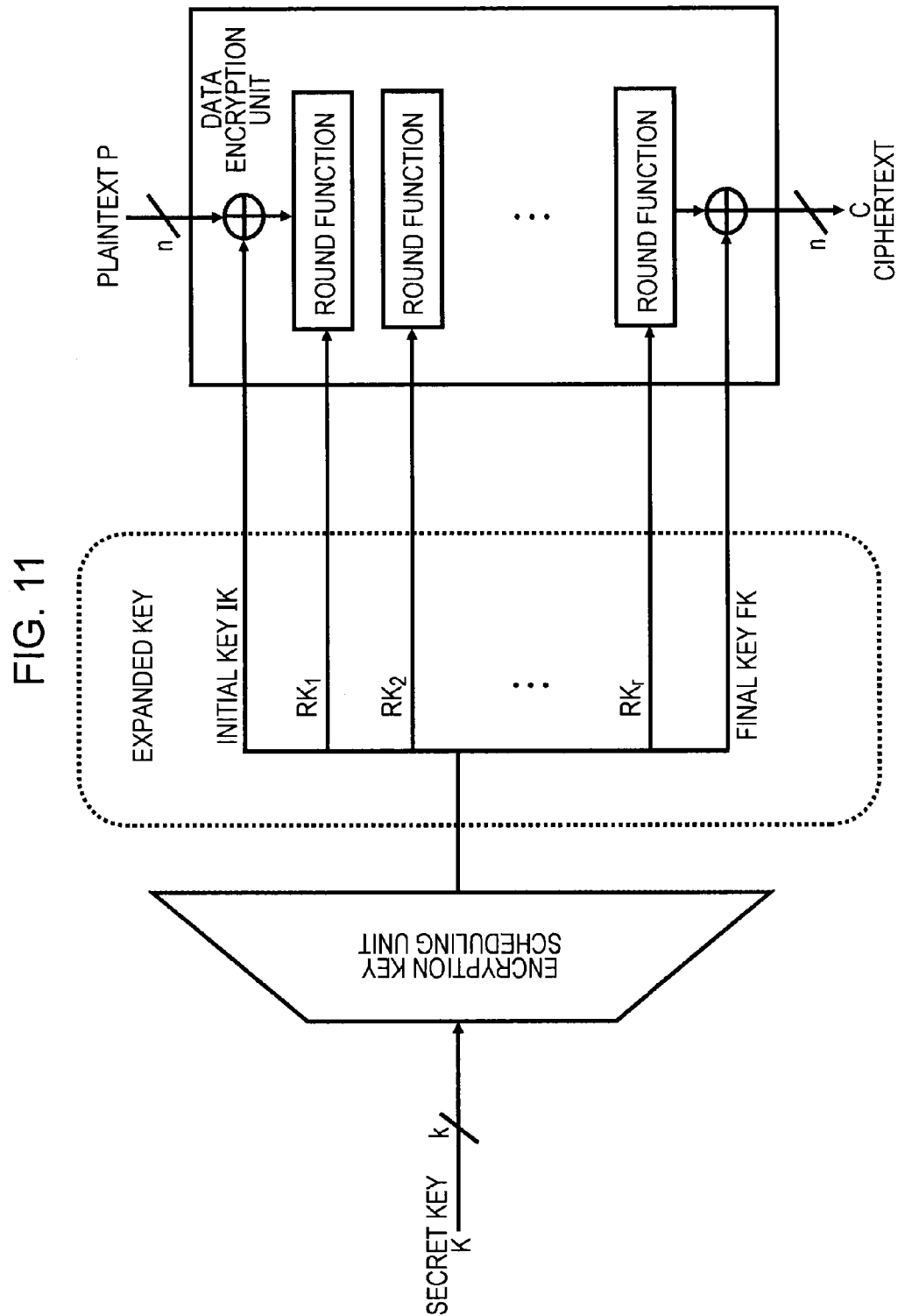
FIG. 11 is a diagram describing a shared key block encryption.

Shared key block encryption will be described again with reference to FIG. 11. The shared key block encryption algorithm is configured by a data encryption unit including a round function repeatedly executing conversion of input data, and a key scheduling unit generating round keys to be applied at each round of a round function unit. The key scheduling unit inputs the secret key, and generates round keys to be input into each round function.

For example, regarding a block encryption with a configuration that performs an r repetitions of round functions, round keys RK1, RK2, . . . , Rr are input into the round functions from repetition 1 through repetition r. Also, an XOR is performed on an IK as the initial key and an FK as the final key.

(2-2. Feistel Structure)

Figure 12:
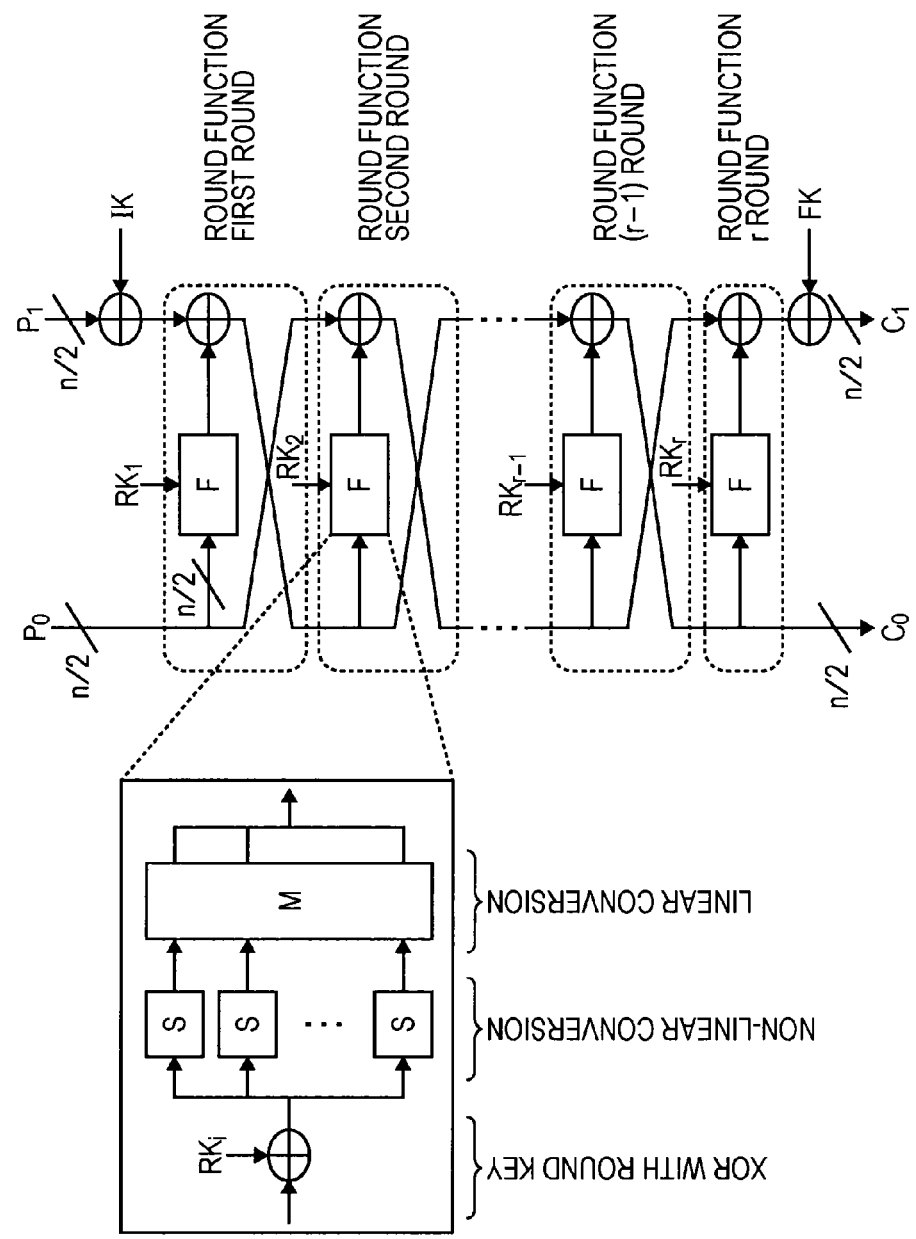
FIG. 12 is a diagram describing a Feistel structure.

The Feistel structure will be described with reference to FIG. 12. The Feistel structure is the typical structure for data encryption units regarding shared key block encryption. FIG. 12 illustrates an example configuration of a specific Feistel structure when the block length is n bits.

When looking at FIG. 12, the configuration enables the n-bit data to be divided into two lines of n/2 bits, one line of these n/2 bits is input into the F function within a round, and an XOR is performed on this output and the other line of n/2 bits. Various types of F function configurations can be considered. As one example, configurations are known in which processing is performed as in the F function illustrated in FIG. 12 such that an XOR is performed on the round key, a non-linear calculation called an S-box is performed, and then a linear conversion is performed by a matrix calculation.

Also, the configuration illustrated in FIG. 12 is one configuration example of a Feistel structure, and other configuration examples are possible by changing the position of the XOR calculation on the IK and FK.

(2-3. Expanded Feistel Structure)

The expanded Feistel structure will be described with reference to FIG. 13. According to the previous description on Feistel structures, the configuration performed a division into two lines of n/2 bits and then processed this, but an expansion to a form in which divisions into three or more lines is possible. For example, there is that called a 4-line expanded Feistel structure that performs a division into four lines of n/4 bits and then processes this.

Figure 13:
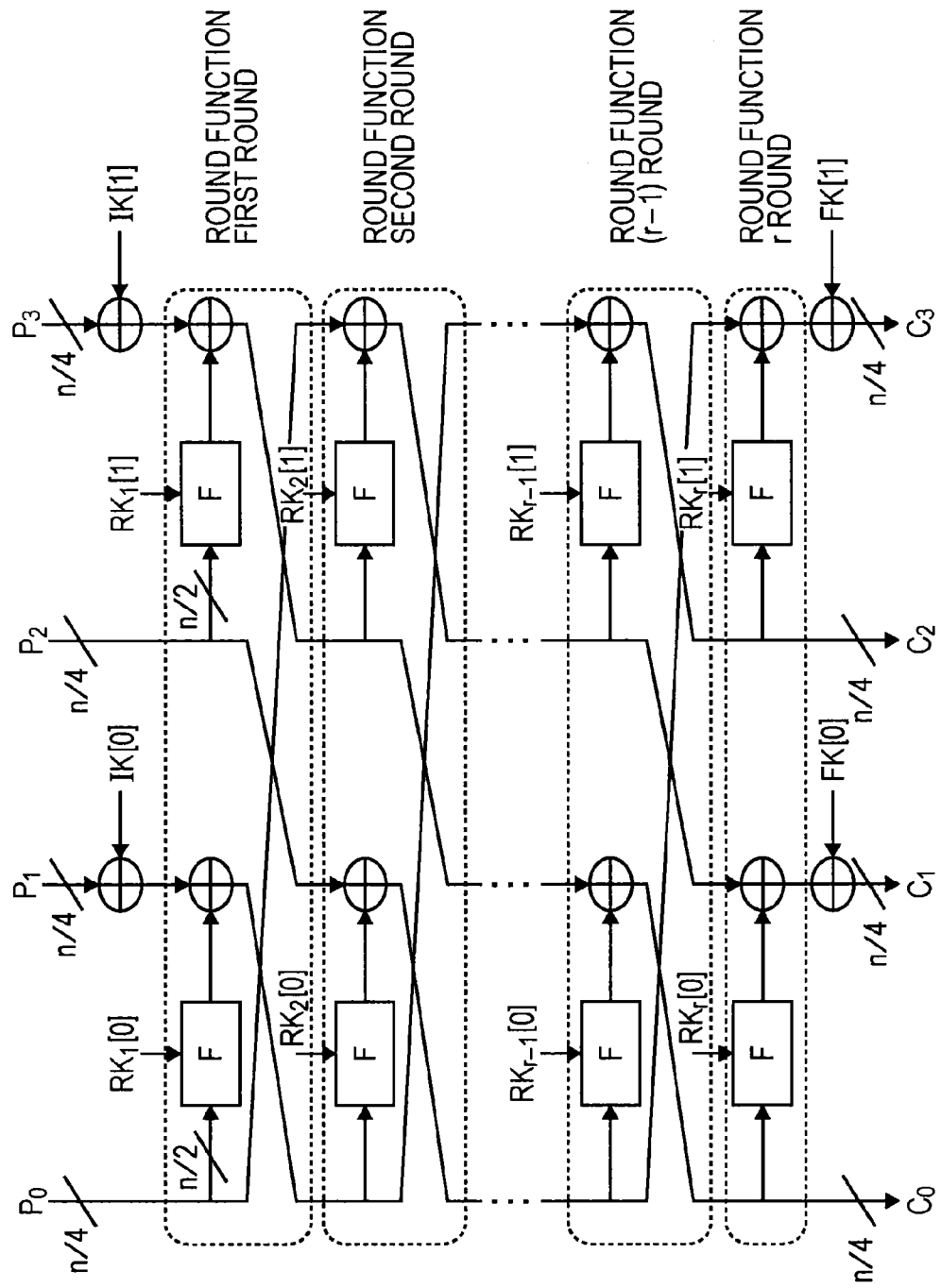
FIG. 13 is a diagram describing an expanded Feistel structure.

FIG. 13 illustrates a configuration example of a specific 4-line expanded Feistel structure. When looking at FIG. 13, the configuration enables the n-bit data to be divided into four lines of n/4 bits, two of these lines are input into the F function within a round, and an XOR is performed on this output and the other two lines. By changing from a 2-line to a 4-line, a round key RKi, the initial key IK, and the final key FK are divided from n/2 bits into an RKi[0], an RKi[1], an IK[0], an IK[1], an FK[0], and an FK[1] of n/4 bits. The previous description was described regarding a 4-line expanded Feistel structure, but all Feistel structures more than two lines are called expanded Feistel structures. For the sake of clarity regarding the description of the embodiments according to the present disclosure, we will describe only 4-line Feistel structures.

(2-4. Overview of and Problems with Miniaturization Techniques According to the Related Art)

(2-4-1. Miniaturization Techniques Regarding AES Encryption Algorithms Applying SPN Structures)

As previously described, Hamalainen, Alho, Hannikainen, Hamalainen, et al. have proposed an AES miniaturization method regarding AES encryption algorithms applying SPN structures. NPL 3: Panu Hamalainen, Timo Alho, Marko Hannikainen, and Timo D. Hamalainen. Design and implementation of low-area and low-power AES encryption hardware core. In DSD, pages 577-583. IEEE Computer Society, 2006. 9.

Figure 14:
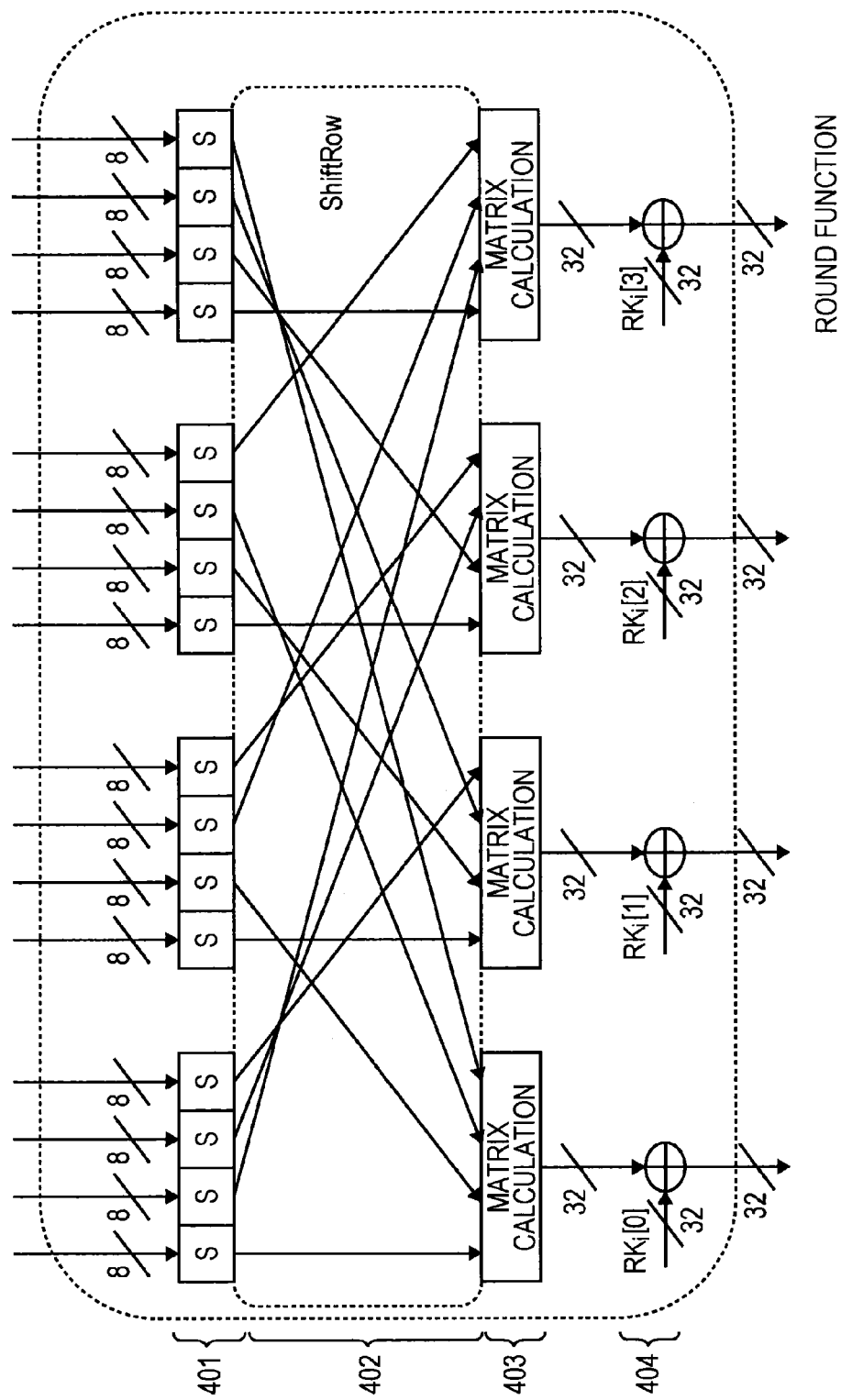
FIG. 14 is a diagram describing a structure of a round function in an AES encryption algorithm applying an SPN structure.

First, a structure of a round function in an AES encryption algorithm applying an SPN structure will be described with reference to FIG. 14. Further, the configuration is similar to Feistel structures regarding AES encryption algorithms applying SPN structures in that a round functions is repeatedly executed multiple times. FIG. 14 is a diagram illustrating a configuration example of a round function execution unit used in an AES encryption algorithm applying an SPN structure. According to AES, the round function illustrated in FIG. 14 is repeated multiple times to perform a generation of ciphertext from plaintext and a generation of plaintext from ciphertext.

The round function execution unit illustrated in FIG. 14 is configured by the following configuration elements. A non-linear conversion unit 401 made from 16 S-boxes with 8-bit inputs and outputs for executing a non-linear conversion processing, a ShiftRow executing unit 402 as the shuffling processing of the 8-bit output from the S-boxes configuring the non-linear conversion unit, a linear conversion unit 403 made from four matrix calculating units for executing linear processing applying matrices inputting the output of the ShiftRow executing unit in 32-bit units, and an XOR calculation unit 404 made from four calculating units for executing XOR calculations on 32-bit round keys against the 32-bit output from each of the four matrix calculating units configuring the linear conversion unit 403.

The example illustrated in FIG. 14 is a 128-bit round function execution unit with 128-bit input and output, and is a configuration that performs an input of a total of 8×16=128 bits into 16 8-bit S-boxes, and an output of a total of 32×4=128 bits to the four 32-bit XOR calculation units.

A series of processing applying the non-linear conversion unit 401, the ShiftRow executing unit 402, the linear conversion unit 403, and the XOR calculation unit 404 is executed as the execution processing of one round function, and this round function is repeated multiple times, to generate and output 128-bit output (ciphertext for example) from 128-bit input data (plaintext for example).

Regarding the implementation of AES, if the processing of one round function (1 round), that is to say, the series of processing applying the non-linear conversion unit 401, the ShiftRow executing unit 402, the linear conversion unit 403, and the XOR calculation unit 404, is executed at one cycle, the configuration of the data encryption unit requires at least the 16 S-box circuits and the four matrix calculation circuits, as illustrated in FIG. 14.

Hamalainen, et al. achieved a miniaturization of the data encryption unit by extended one round over 16 cycles. According to this miniaturization configuration, miniaturization of the matrix calculation circuit is achieved by using one S-box circuit, and implementing one matrix calculation to execute over four cycles.

Figure 15:
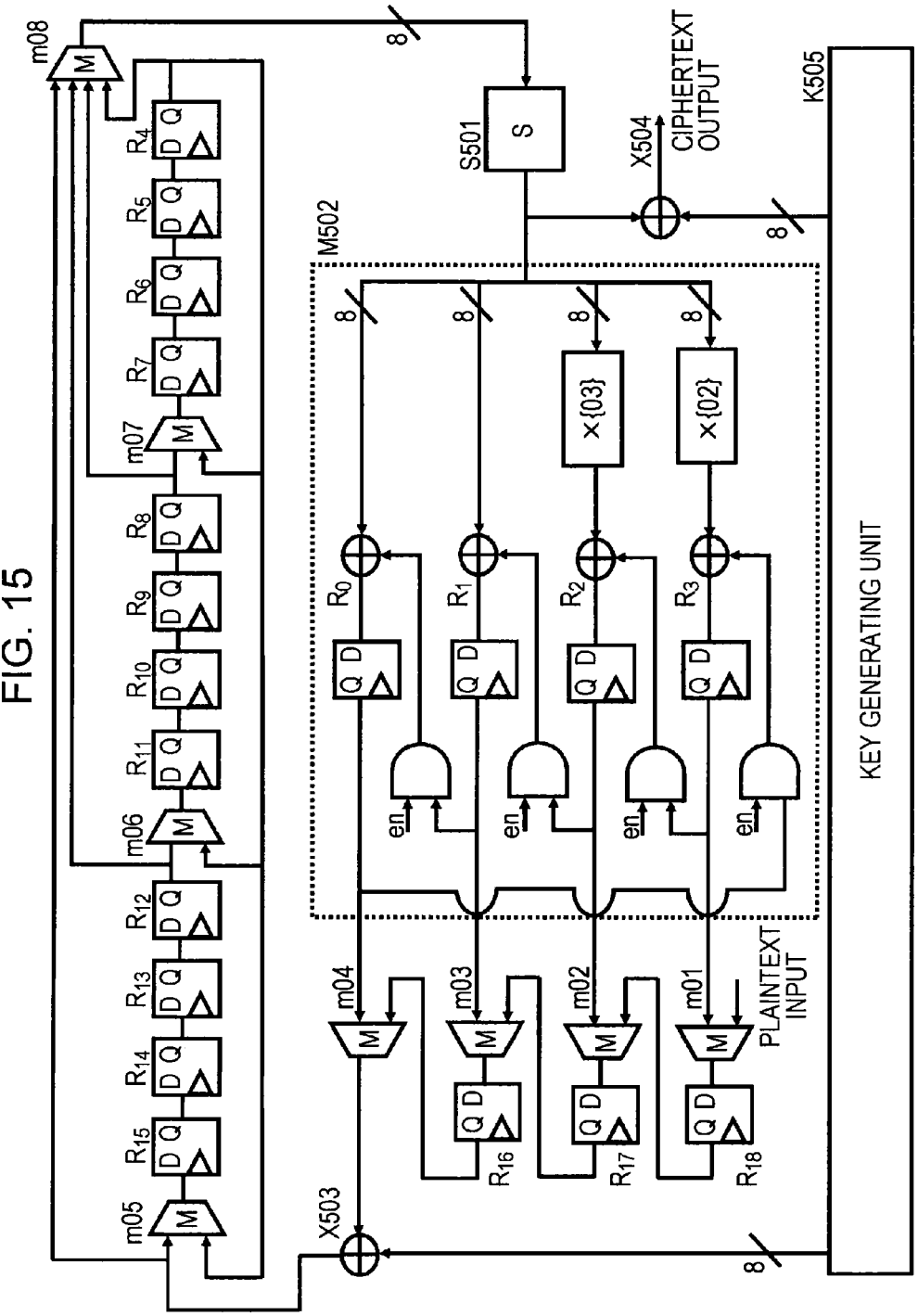
FIG. 15 is a diagram illustrating a data path of a data encryption unit executing the AES encryption proposed by Hamalainen, et al.

FIG. 15 illustrates a data path for the data encryption unit executing the AES encryption proposed by Hamalainen, et al. The configuration illustrated in FIG. 15 corresponds to a hardware configuration executing the AES encryption round function illustrated in FIG. 14.

Regarding the configuration illustrated in FIG. 15, the data being calculated is divided into 8-bit units, and each 8-bit data is stored in registers R0 through R18. There are 19 registers illustrated in FIG. 15. Each of the 19 registers (R0 through R18) is an 8-bit register for storing 8-bit data. Per the description with reference to FIG. 14, the configuration illustrated in FIG. 14 is a round function execution unit with 128-bit input and output, and FIG. 15 corresponds to a hardware configuration executing the round function with 128-bit input and output as serial processing of data in 8-bit units.

Regarding the configuration in FIG. 15, the number of 8-bit registers necessary for storing all of the input and output data is 16 as 128/8=16, and so 16 registers are sufficient. There are 19 registers in FIG. 15 of which three of these registers are more than necessary, but these three 24-bit registers are used for the matrix calculation processing for executing the linear conversion processing applying matrices.

Also, as described with reference to FIG. 14, according to AES, data conversion is executed by a ShiftRow executing unit between the S-box executing the non-linear conversion and the matrix calculation executing the linear conversion. According to the implementation technique from Hamalainen, et al., replacement performed by the ShiftRow executing unit is achieved by inserting multiplexors m01 through m08 before several of the registers in FIG. 15.

As illustrated in FIG. 15, an S501 is an S-box as the non-linear conversion unit, of which there is only one. 8-bit data is sequentially input into the S501, which is an S-box, and the non-linear conversion processing is executed by 16 S-boxes illustrated in FIG. 14 over 16 cycles. The output of S501, which is an S-box, is input into a matrix calculation circuit M502, and the linear conversion processing is executed applying a matrix by the matrix calculation circuit M502.

Further, according to the configuration in FIG. 14, the configuration enables the matrix calculation to be performed after the data to be processed by the S-box is replaced by the ShiftRow executing unit, but according to the configuration illustrated in FIG. 15, the configuration enables the output from the S501, which is an S-box, to be input directly into the matrix calculation circuit M502. According to the configuration in FIG. 15, the processing corresponding to the replacement processing by the ShiftRow executing unit is performed by the operation of the multiplexors m01 through m08 and the registers R0 through R18 illustrated in FIG. 15.

At the matrix calculation circuit M502 illustrated in FIG. 15, the processing of the four matrix calculation circuits in the linear conversion unit 403 illustrated in FIG. 14 is sequentially executed. The linear conversion processing is executed over for four cycles applying a matrix to be executed by one matrix calculation circuit from the four matrix calculation circuits in the linear conversion unit 403 illustrated in FIG. 14. The XOR calculation processing of the XOR calculation unit 404 illustrated in FIG. 14 is executed by an XOR calculation unit X503 and X504. These XOR calculation units X503 and X504 execute the XOR processing on the processing data and the round key output by a key generating unit K505.

Figure 16:
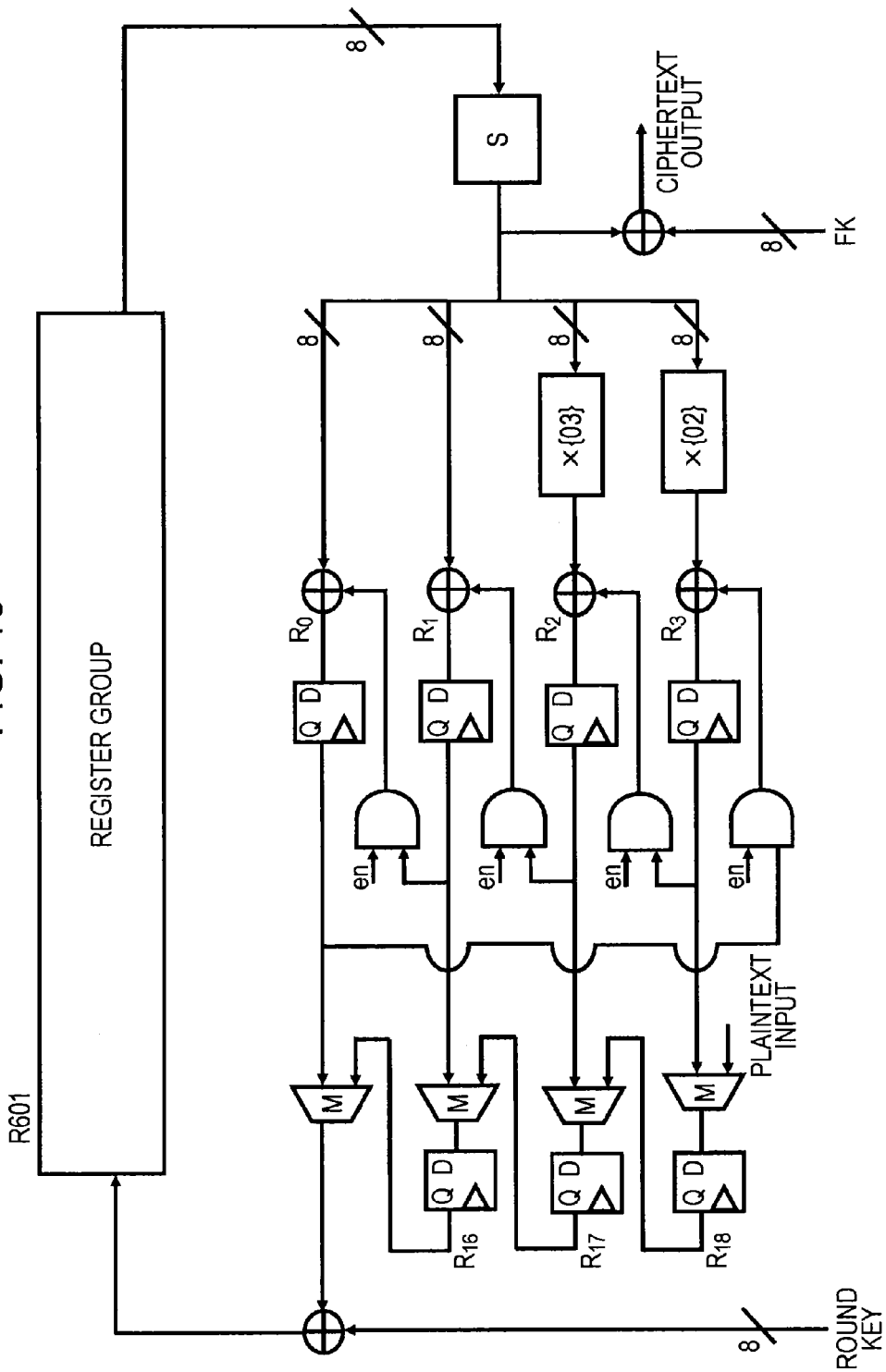
FIG. 16 is a diagram describing a configuration example of a data encryption unit.

Further, in order to describe only a certain section fundamentally related to the configuration according to the present disclosure, the circuit performing the replacement such as ShiftRow and the key scheduling unit is described by an abbreviated data path as illustrated in FIG. 16. The portion described regarding the group of registers in FIG. 16 store 96 bits worth of data, and represent a group of registers with consideration to the ShiftRow. Regarding the implementation of AES, when calculating one round at one cycle, the registers to be used for the data encryption unit only need to be 128 bits worth, which is the block length.

Conversely, according to the implementation method from Hamalainen, et al., this is increased by 24 bits to 152 bits worth. This is because it becomes necessary to store 32 bits worth of calculation results currently processing until the end of the calculation of the matrix when dividing the input into the matrix every eight bits. For this reason, it is obvious that 32 bits worth of registers are added. Conversely, the values to be input into the matrix are necessary for the next round. When considering this, 8 bits worth of the register for the first input from this 32 bits to be input into the matrix can be shared with the registers for the matrix calculation unit, and so the amount of increase in the registers is 32−8=24 bits to which the increase is suppressed.

(2-4-2. Problem with Application of Miniaturization Implementation Configuration for SPN Structures to Expanded Feistel Structures)

As previously described, Hamalainen, et al. have achieved a miniaturization of SPN structures. However, this miniaturization configuration is a specialized configuration corresponding to SPN structures, and so a sufficient advantage cannot be obtained when applying this miniaturization implementation method to expanded Feistel structures.

The following will describe these problems. Further, according to the following description, the expanded Feistel structure will be described as that conceptually including Feistel structures. When applying the implementation method from Hamalainen, et al. to the configuration executing an algorithm such as CLEFIA having an expanded Feistel structure, registers are necessary for storing the data amount of the bit length of the output from the matrix in order to calculate the matrix.

This is because expanded Feistel structures are different from SPN structures, for example, it is necessary to use the value input into the F function in the round function in the next round as well, and this fundamental difference with this processing sequence is a problem.

Figure 17:
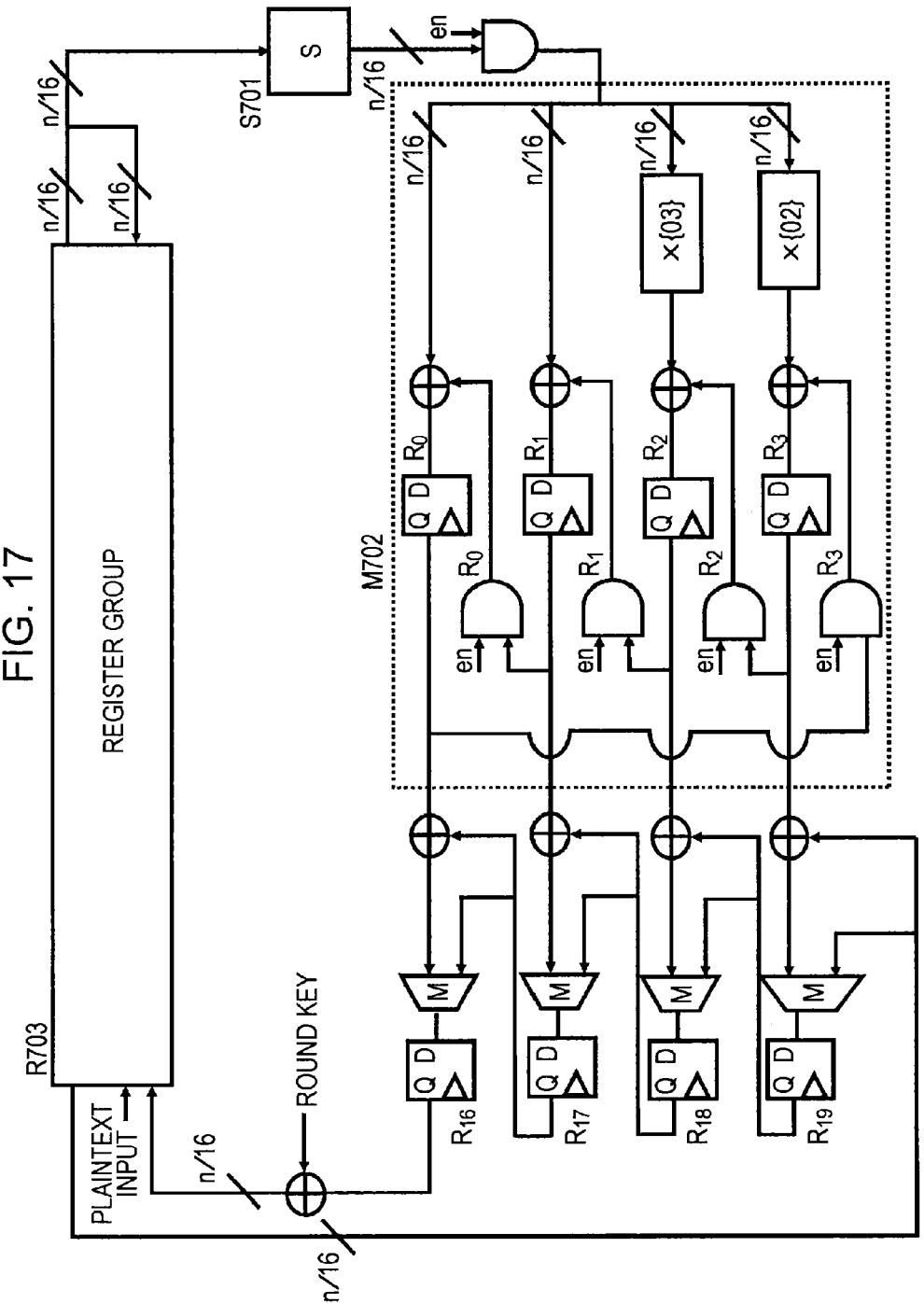
FIG. 17 is a diagram illustrating an overview diagram of a data calculation unit circuit when applying the implementation method from Hamalainen, et al. to a 4-line expanded Feistel structure.

FIG. 17 is a diagram illustrating an overview diagram of a data calculating circuit when applying the implementation method from Hamalainen, et al. to the 4-line expanded Feistel structure. According to FIG. 17, the replacement operation and key scheduling unit at the end of the round function in the expanded Feistel structure are omitted, which is similar to the AES data path previously described with reference to FIG. 16. Further, the block size for the size of processing data in the round calculation is n bits.

As previously described with reference to FIG. 13, according to the 4-line expanded Feistel structure, n/4 bits are input into each of the four lines and then sequentially transferred. A register group R703 as in FIG. 17 corresponds to a register group R601 illustrated in FIG. 16. However, the register group R703 as in FIG. 17 corresponding to the 4-line expanded Feistel structure is configured as a combination of registers for storing the (¾)n bits worth of data and a multiplexor, etc. for achieving a processing similar to the replacement operation at the end of a round.

Further, the calculation applying and executing the data path (calculation executing circuit) for the encryption algorithm applying the 4-line expanded Feistel structure illustrated in FIG. 17 corresponds to the calculation processing applying the 4-line expanded Feistel structure illustrated in FIG. 13. Thus, the round function including an F function within the 4-line expanded Feistel structure illustrated in FIG. 13 is executed using this data path illustrated in FIG. 17.

Figure 18:
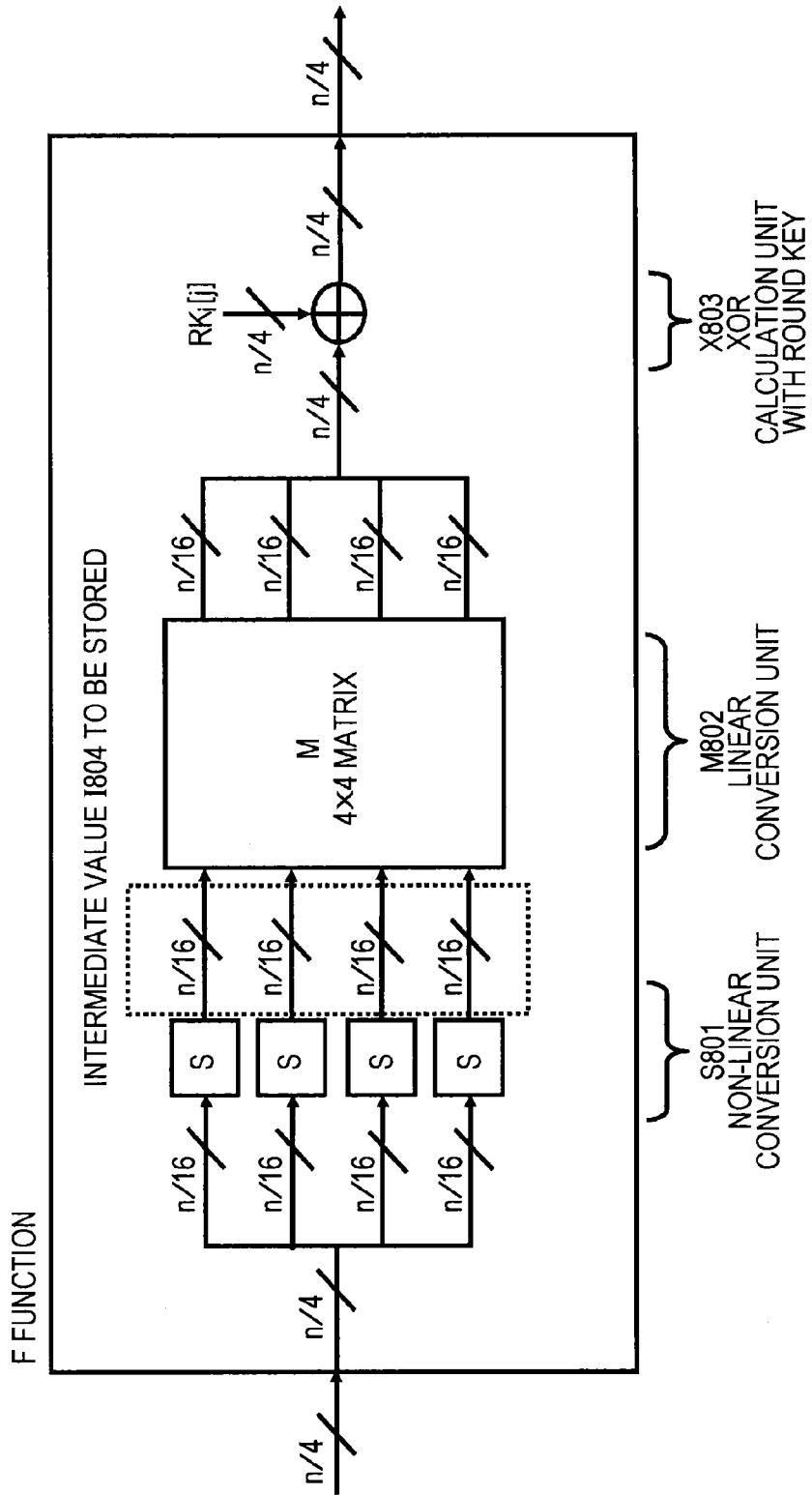
FIG. 18 is a diagram describing a specific example of an F function within the round function.

FIG. 18 illustrates a specific example of an F function within a round function. The F function illustrated in FIG. 18 has the following configuration elements.

A non-linear conversion unit S801 made from an S-box executing non-linear processing, an M802 performing a linear conversion processing by a matrix calculation against the output from the non-linear conversion unit S801, and an XOR calculation unit X803 for executing an XOR calculation with the round key against the output from the linear conversion unit M802, and so these are the previously described configuration elements. The F function illustrated in FIG. 18 is called an SP type of F function.

However, the input and output corresponding to the F function regarding the 4-line expanded Feistel structure is n/4 bits. Further, a linear conversion unit M801 illustrated in FIG. 18 is assumed to be a cyclic matrix as illustrated below (Expression 1), which is similar to the matrix adopted by the AES encryption algorithm.

[Math. 1]

$$\begin{pmatrix} y_0 \\ y_1 \\ y_2 \\ y_3 \end{pmatrix} = \begin{pmatrix} 0x02 & 0x03 & 0x01 & 0x01 \\ 0x01 & 0x02 & 0x03 & 0x01 \\ 0x01 & 0x01 & 0x02 & 0x03 \\ 0x03 & 0x01 & 0x01 & 0x02 \end{pmatrix} \begin{pmatrix} x_0 \\ x_1 \\ x_2 \\ x_3 \end{pmatrix} \quad \text{(Expression 1)}$$

Further, the ($x_0$, $x_1$, $x_2$, and $x_3$) illustrated in Expression 1 correspond to the input corresponding to the linear conversion unit M801, which is the matrix calculating circuit, (output from the S-box)

the ($y_0$, $y_1$, $y_2$, and $y_3$) correspond to the output from the linear conversion unit M801, which is the matrix calculating circuit (linear conversion result), and the 4×4 matrix corresponds to the matrix applied in the linear conversion unit M801, which is the matrix calculating circuit.

Further, the elements in the 4×4 matrix represent hexadecimal values.

According to the present example, each of the ($x_0$, $x_1$, $x_2$, and $x_3$) is 8-bit data which is the output from the S-box corresponding to one cycle. Each of the output ($y_0$, $y_1$, $y_2$, and $y_3$) is also 8-bit data.

As we will be comparing this with the configuration of the AES encryption algorithm previously described with reference to FIG. 14 through FIG. 16, the block configuration bits n is designated as n=128 bits as the processing unit.

Similar to the circuit illustrated in FIG. 16, the circuit illustrated in FIG. 17 also has only one S-box. This is the S701, which is an S-box, illustrated in FIG. 17. This S701, which is an S-box, executes over one cycle the processing of one S-box configured within the F function illustrated in FIG. 18.

The processing of each S-box illustrated in FIG. 18 is performed sequentially every cycle.

As illustrated in FIG. 18, ¼ of the n/4 bits transferred to line of the 4-line expanded Feistel structure, that is to say, n/16 bits are input into one S-box in the F function, and the non-linear conversion processing is executed.

n/16 bits are input into the S-box S701 illustrated in FIG. 17 every cycle, and the non-linear conversion processing is executed. The data non-linearly converted in the S701, which is an S-box, is input into a linear conversion circuit M702, which is next, every n/16 bits at one-cycle units. The linear conversion processing applying a previously determined matrix is executed by the linear conversion circuit M702.

We will now compare a calculation executing circuit excluding the register group R703 within the data path configuration of the encryption algorithm applying the 4-line expanded Feistel structure illustrated in FIG. 17 and a calculation executing circuit excluding the register group R601 described with reference to FIG. 16, executing the AES encryption processing using the SPN structure.

The eight 8-bit registers R0 through R3 and R16 through R19 according to the calculating circuit illustrated in FIG. 17 correspond to the seven 8-bit registers R0 through R3 and R16 through R18 according to the calculation circuit illustrated in FIG. 16. That is to say, the number of 8-bit registers is increased by one.

In this way, when applying the configuration proposed by Hamalainen, et al. to the expanded Feistel structure, in addition to the block length worth of registers, l-line worth of registers is also necessary, as with the calculating circuit illustrated in FIG. 17. The increase in registers has a significant effect on the circuit scale, and so it is preferable if a configuration is possible which only has the block length worth of registers.

The following issues are examples of the problems with the technique according to the related art.

The circuit scale of the registers is comparatively larger when compared to other cells, and the increase in the number of registers has a significant effect on the circuit scale. For this reason, an implementation method restricting the increase in registers can be considered as one direction for achieving miniaturization. According to the implementation method regarding the technique according to the related art, registers more than the block length amount are necessary, which can be considered a problem.

3. Example of Encryption Processing Configurations Achieving Reductions in Registers When the implementation method from Hamalainen, et al. is applied to an algorithm having an expanded Feistel structure, the necessary registers increases as described in the previous section. This is because the output of the F function is calculated while the input for the F function is still being stored as the input for the F function is used at the next round. When implementation under this conception, both the registers storing the input for the F function and the registers for storing the intermediate values during the F function calculation are necessary.

According to the encryption algorithm applying the 4-line expanded Feistel structure previously described using FIG. 17 and FIG. 18, in addition to the block length worth of registers, a 32-bit register, which is l-line worth, is necessary as it is necessary to store the intermediate value during the matrix calculation expressed by the linear conversion unit M802 within the F function.

According to the embodiments to be described later, the input for the F function is deleted once, and the registers storing this input are used as registers for storing the intermediate values during the F function calculation.

After executing an XOR on the output values of the F function and a different line from the lines input into the F function, it has been considered to restore the input for the F function from the intermediate values during the F function calculation.

By doing so in this way, simultaneously storing the input values for the F function and the intermediate values during the F function calculation is no longer necessary, and the number of registers can be reduced.

Hereafter, a specific example will be described. In order to easily compare this with the previously described configuration, an example of a 4-line expanded Feistel structure having the F function illustrated in FIG. 18 will be described. Further, the linear conversion unit M801 illustrated in FIG. 18 is assumed to be a cyclic matrix expressed by the following (Expression 2), which is similar to the matrix adopted by the AES encryption algorithm.

[Math. 2]

$$\begin{pmatrix} y_0 \\ y_1 \\ y_2 \\ y_3 \end{pmatrix} = \begin{pmatrix} 0x02 & 0x03 & 0x01 & 0x01 \\ 0x01 & 0x02 & 0x03 & 0x01 \\ 0x01 & 0x01 & 0x02 & 0x03 \\ 0x03 & 0x01 & 0x01 & 0x02 \end{pmatrix} \begin{pmatrix} x_0 \\ x_1 \\ x_2 \\ x_3 \end{pmatrix} \quad \text{(Expression 2)}$$

Figure 19:
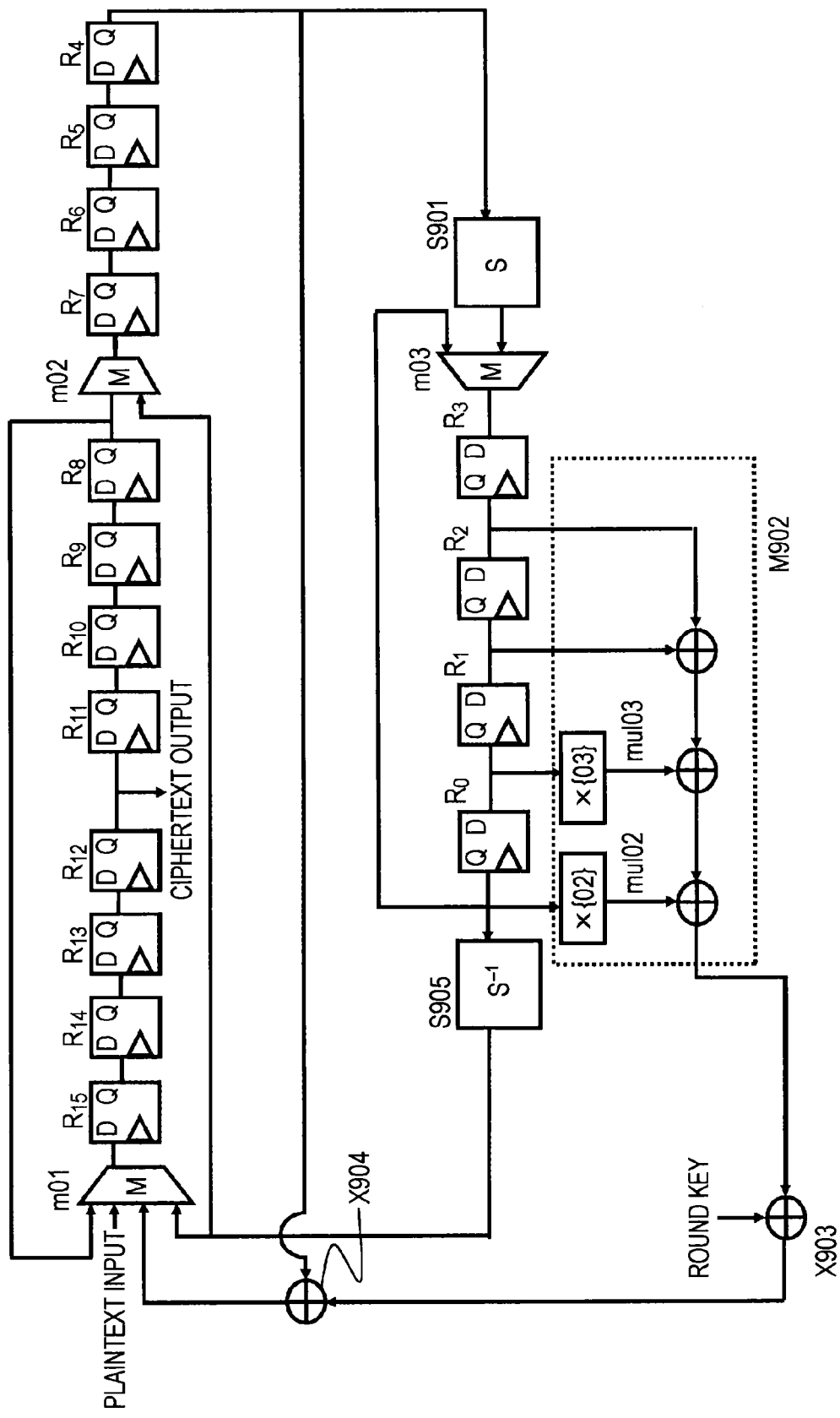
FIG. 19 is a diagram illustrating an overview diagram of a data calculation unit circuit when applying an encryption processing configuration related to an embodiment of the present disclosure to a 4-line expanded Feistel structure having the F function illustrated in FIG. 18.

FIG. 19 is an overview diagram of a data calculating circuit when applying the encryption processing configuration related to an embodiment of the present disclosure to the 4-line Feistel structure having the F function illustrated in FIG. 18.

As introduced in the previously described section (2-4-2. Problem with Application of Miniaturization Implementation Configuration for SPN Structures to Expanded Feistel Structures), when applying the implementation method from Hamalainen, et al. to the 4-line expanded Feistel structure having the F function illustrated in FIG. 18, the registers for storing the intermediate values during the matrix calculation expressed by the linear conversion unit M802 within the F function as in FIG. 18 are necessary.

In contrast, the values to be input into the linear conversion unit M802 after the non-linear conversion unit S801 are stored as the intermediate values as in FIG. 19 in which the encryption processing configuration related to an embodiment according to the present disclosure is used to achieve this. The intermediate value to be stored by this technique is represented as an intermediate value I804 for storing as in FIG. 18. According to FIG. 19, the previously described intermediate values are stored in registers represented by R0 through R3 illustrated in FIG. 19.

Also, when the implementation method from Hamalainen, et al. is applied to the 4-line expanded Feistel structure having the F function illustrated in FIG. 18, registers necessary for storing the input values for the F function which are necessary for calculating the next round become necessary, in addition to the registers for storing the intermediate values during the matrix calculation expressed by the linear conversion unit M802 within the F function as in FIG. 18. In contrast, in FIG. 19 the input values for the F function necessary for calculating the next round are not stored, and instead the intermediate value I804, which is the value to be input into the linear conversion unit M802 after the non-linear conversion unit S801 within the F function as in FIG. 18 previously described, is stored.

In contrast to the 160 bits worth of registers used according to the implementation method from Hamalainen, et al. as introduced in the previously described section (2-4-2. Problem with Application of Miniaturization Implementation Configuration for SPN Structures to Expanded Feistel Structures), the circuit regarding the configuration illustrated in FIG. 19 is achieved by a total of only 128 bits worth of registers using 16 8-bit registers R0 through R15.

The round function expressed in FIG. 13 and FIG. 18 is executed using this data path illustrated in FIG. 19.

If FIG. 13 is referenced, it is understood that two F functions are necessary to calculate one round. According to FIG. 19, the output of one F function is executed over four cycles, and after another four cycles, the input for the F function is restored from the intermediate value I, 804 to be stored as in FIG. 18.

As previously described, it is necessary to execute two F functions in one round, and so one round worth of calculations are executed by requiring a total of 16 cycles. Also, when inputting plaintext, this is considered to be input over 16 cycles every eight bits starting from the top bits, and when outputting ciphertext, this is also considered to be sequentially output over 16 cycles every eight bits from the output port starting from the top eight bits.

Hereafter, the flow of data during the 16 cycles when inputting plaintext, the 16 cycles necessary for the calculation of one round, and the 16 cycles when outputting ciphertext will be described with reference to Table 1 illustrated below.

TABLE 1

| Data Stored in Registers | | | | | |
|---|---|---|---|---|---|
| | cycle | | | | |
| | 0 | 1 | 2 | 3 | 4 |
| $R_0$ | $S(x_0)$ | $S(x_1)$ | $S(x_2)$ | $S(x_3)$ | $S(x_0)$ |
| $R_1$ | $S(x_1)$ | $S(x_2)$ | $S(x_3)$ | $S(x_0)$ | $S(x_1)$ |
| $R_2$ | $S(x_2)$ | $S(x_3)$ | $S(x_0)$ | $S(x_1)$ | $S(x_2)$ |
| $R_3$ | $S(x_3)$ | $S(x_0)$ | $S(x_1)$ | $S(x_2)$ | $S(x_3)$ |

TABLE 1-continued

| Data Stored in Registers | | | | | |
|---|---|---|---|---|---|
| $R_4$ | $x_4$ | $x_5$ | $x_6$ | $x_7$ | $x_8$ |
| $R_5$ | $x_5$ | $x_6$ | $x_7$ | $x_8$ | $x_9$ |
| $R_6$ | $x_6$ | $x_7$ | $x_8$ | $x_9$ | $x_{10}$ |
| $R_7$ | $x_7$ | $x_8$ | $x_9$ | $x_{10}$ | $x_{11}$ |
| $R_8$ | $x_8$ | $x_9$ | $x_{10}$ | $x_{11}$ | $x_{12}$ |
| $R_9$ | $x_9$ | $x_{10}$ | $x_{11}$ | $x_{12}$ | $x_{13}$ |
| $R_{10}$ | $x_{10}$ | $x_{11}$ | $x_{12}$ | $x_{13}$ | $x_{14}$ |
| $R_{11}$ | $x_{11}$ | $x_{12}$ | $x_{13}$ | $x_{14}$ | $x_{15}$ |
| $R_{12}$ | $x_{12}$ | $x_{13}$ | $x_{14}$ | $x_{15}$ | $x_4 \oplus f_0 (=y_0)$ |
| $R_{13}$ | $x_{13}$ | $x_{14}$ | $x_{15}$ | $x_4 \oplus f_0$ | $x_5 \oplus f_1 (=y_1)$ |
| $R_{14}$ | $x_{14}$ | $x_{15}$ | $x_4 \oplus f_0$ | $x_5 \oplus f_1$ | $x_6 \oplus f_2 (=y_2)$ |
| $R_{15}$ | $x_{15}$ | $x_4 \oplus f_0$ | $x_5 \oplus f_1$ | $x_6 \oplus f_2$ | $x_7 \oplus f_3 (=y_3)$ |

| | cycle | | | | |
|---|---|---|---|---|---|
| | 4 | 5 | 6 | 7 | 8 |
| $R_0$ | $S(x_0)$ | $S(x_1)$ | $S(x_2)$ | $S(x_3)$ | $S(x_8)$ |
| $R_1$ | $S(x_1)$ | $S(x_2)$ | $S(x_3)$ | $S(x_8)$ | $S(x_9)$ |
| $R_2$ | $S(x_2)$ | $S(x_3)$ | $S(x_8)$ | $S(x_9)$ | $S(x_{10})$ |
| $R_3$ | $S(x_3)$ | $S(x_8)$ | $S(x_9)$ | $S(x_{10})$ | $S(x_{11})$ |
| $R_4$ | $x_8$ | $x_9$ | $x_{10}$ | $x_{11}$ | $x_{12}$ |
| $R_5$ | $x_9$ | $x_{10}$ | $x_{11}$ | $x_{12}$ | $x_{13}$ |
| $R_6$ | $x_{10}$ | $x_{11}$ | $x_{12}$ | $x_{13}$ | $x_{14}$ |
| $R_7$ | $x_{11}$ | $x_{12}$ | $x_{13}$ | $x_{14}$ | $x_{15}$ |
| $R_8$ | $x_{12}$ | $x_{13}$ | $x_{14}$ | $x_{15}$ | $y_0$ |
| $R_9$ | $x_{13}$ | $x_{14}$ | $x_{15}$ | $y_0$ | $y_1$ |
| $R_{10}$ | $x_{14}$ | $x_{15}$ | $y_0$ | $y_1$ | $y_2$ |
| $R_{11}$ | $x_{15}$ | $y_0$ | $y_1$ | $y_2$ | $y_3$ |
| $R_{12}$ | $y_0$ | $y_1$ | $y_2$ | $y_3$ | $x_0 (=y_{12})$ |
| $R_{13}$ | $y_1$ | $y_2$ | $y_3$ | $x_0$ | $x_1 (=y_{13})$ |
| $R_{14}$ | $y_2$ | $y_3$ | $x_0$ | $x_1$ | $x_2 (=y_{14})$ |
| $R_{15}$ | $y_3$ | $x_0$ | $x_1$ | $x_2$ | $x_3 (=y_{15})$ |

| | cycle | | | | |
|---|---|---|---|---|---|
| | 8 | 9 | 10 | 11 | 12 |
| $R_0$ | $S(x_8)$ | $S(x_9)$ | $S(x_{10})$ | $S(x_{11})$ | $S(x_8)$ |
| $R_1$ | $S(x_9)$ | $S(x_{10})$ | $S(x_{11})$ | $S(x_8)$ | $S(x_9)$ |
| $R_2$ | $S(x_{10})$ | $S(x_{11})$ | $S(x_8)$ | $S(x_9)$ | $S(x_{10})$ |
| $R_3$ | $S(x_{11})$ | $S(x_8)$ | $S(x_9)$ | $S(x_{10})$ | $S(x_{11})$ |
| $R_4$ | $x_{12}$ | $x_{13}$ | $x_{14}$ | $x_{15}$ | $y_0$ |
| $R_5$ | $x_{13}$ | $x_{14}$ | $x_{15}$ | $y_0$ | $y_1$ |
| $R_6$ | $x_{14}$ | $x_{15}$ | $y_0$ | $y_1$ | $y_2$ |
| $R_7$ | $x_{15}$ | $y_0$ | $y_1$ | $y_2$ | $y_3$ |
| $R_8$ | $y_0$ | $y_1$ | $y_2$ | $y_3$ | $y_{12}$ |
| $R_9$ | $y_1$ | $y_2$ | $y_3$ | $y_{12}$ | $y_{13}$ |
| $R_{10}$ | $y_2$ | $y_3$ | $y_{12}$ | $y_{13}$ | $y_{14}$ |
| $R_{11}$ | $y_3$ | $y_{12}$ | $y_{13}$ | $y_{14}$ | $y_{15}$ |
| $R_{12}$ | $y_{12}$ | $y_{13}$ | $y_{14}$ | $y_{15}$ | $x_{12} \oplus f_8 (=y_8)$ |
| $R_{13}$ | $y_{13}$ | $y_{14}$ | $y_{15}$ | $x_{12} \oplus f_8$ | $x_{13} \oplus f_9 (=y_9)$ |
| $R_{14}$ | $y_{14}$ | $y_{15}$ | $x_{12} \oplus f_8$ | $x_{13} \oplus f_9$ | $x_{14} \oplus f_{10} (=y_{10})$ |
| $R_{15}$ | $y_{15}$ | $x_{12} \oplus f_8$ | $x_{13} \oplus f_9$ | $x_{14} \oplus f_{10}$ | $x_{15} \oplus f_{11} (=y_{11})$ |

| | cycle | | | | |
|---|---|---|---|---|---|
| | 12 | 13 | 14 | 15 | 16 |
| $R_0$ | $S(x_8)$ | $S(x_9)$ | $S(x_{10})$ | $S(x_{11})$ | $S(y_0)$ |
| $R_1$ | $S(x_9)$ | $S(x_{10})$ | $S(x_{11})$ | $S(y_0)$ | $S(y_1)$ |
| $R_2$ | $S(x_{10})$ | $S(x_{11})$ | $S(y_0)$ | $S(y_1)$ | $S(y_2)$ |
| $R_3$ | $S(x_{11})$ | $S(y_0)$ | $S(y_1)$ | $S(y_2)$ | $S(y_3)$ |
| $R_4$ | $y_0$ | $y_1$ | $y_2$ | $y_3$ | $x_8 (=y_4)$ |
| $R_5$ | $y_1$ | $y_2$ | $y_3$ | $x_8$ | $x_9 (=y_5)$ |
| $R_6$ | $y_2$ | $y_3$ | $x_8$ | $x_9$ | $x_{10} (=y_6)$ |
| $R_7$ | $y_3$ | $x_8$ | $x_9$ | $x_{10}$ | $x_{11} (=y_7)$ |
| $R_8$ | $y_{12}$ | $y_{13}$ | $y_{14}$ | $y_{15}$ | $y_8$ |
| $R_9$ | $y_{13}$ | $y_{14}$ | $y_{15}$ | $y_8$ | $y_9$ |
| $R_{10}$ | $y_{14}$ | $y_{15}$ | $y_8$ | $y_9$ | $y_{10}$ |
| $R_{11}$ | $y_{15}$ | $y_8$ | $y_9$ | $y_{10}$ | $y_{11}$ |
| $R_{12}$ | $y_8$ | $y_9$ | $y_{10}$ | $y_{11}$ | $y_{12}$ |
| $R_{13}$ | $y_9$ | $y_{10}$ | $y_{11}$ | $y_{12}$ | $y_{13}$ |
| $R_{14}$ | $y_{10}$ | $y_{11}$ | $y_{12}$ | $y_{13}$ | $y_{14}$ |
| $R_{15}$ | $y_{11}$ | $y_{12}$ | $y_{13}$ | $y_{14}$ | $y_{15}$ |

First, the effect of the 16 cycles when inputting plaintext will be described.

Regarding i∈{0, 1, . . . , 15}, pi is designated as an 8-bit element.

At this time, the plaintext is conceived as the 128 bits represented by (p0, p1, . . . , p15).

At the first cycle when inputting plaintext, p0 is stored in the R15 from a plaintext input port illustrated in FIG. 19 using a multiplexor m01. Over the 11 cycles afterwards, p0 is stored sequentially in R14, R13, . . . , and R4 using a multiplexor m02.

As previously described, after 12 cycles when inputting plaintext, the p0 is stored in R4. At the 13th cycle, the p0 stored in the R4 is input into a non-linear calculation unit S901, and this output is stored in R3 using a multiplexor m03.

The output when the p0 is input into the non-linear calculation unit S901 is designated as S(p0). Afterwards, the S(p0) is stored sequentially in R2, R1, and R0 over three cycles.

Values other than p0 such as pi, i∈(1, 2, . . . , 15) are delayed by an i cycle are stored in the register storing p0. However, the value stored in R4 is input into the non-linear calculation unit S901 at the next cycle, and the S(pi), which is the output of this, is input into R3.

Lastly, after the 16 cycles when inputting plaintext, the multiplexors m01, m02, and m03 are used to store (S(p0), S(p1), S(p2), and S(p3)) in R0 through R3, and (p4, p5, . . . , and p15) in R4 through R15.

Further, the (S(p0), S(p1), S(p2), and S(p3)) input into R0 through R3 match the intermediate value I804 to be stored for the F function described in FIG. 18 regarding the first round.

Next, the flow of data over 16 cycles necessary for the calculation of one round will be described.

Figure 20:
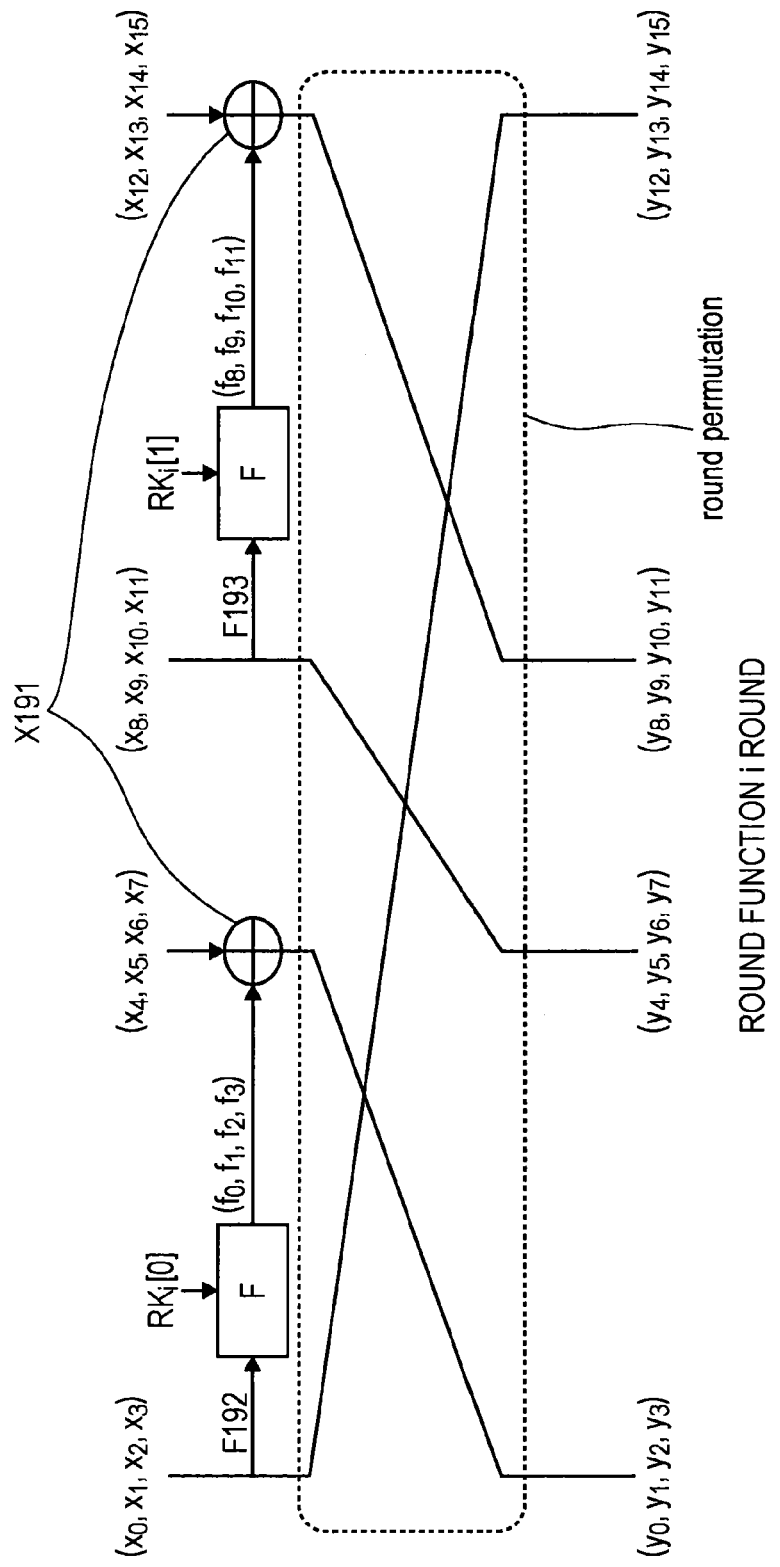
FIG. 20 is a diagram describing a round function.

FIG. 20 illustrates the round function for rounds i∈{1, . . . , r} in FIG. 13.

Now, the input values for the round function for rounds i∈{1, . . . , r} regarding FIG. 20 are designated as (x0, x1, . . . , x15), and the output values of the round function for the i round is designated as (y0, y1, . . . , y15). However, when i=1, (x0, x1, . . . , x15) represents plaintext, and when i=r, (y0, y1, . . . y15) represents ciphertext.

As the initial state when starting a round regarding FIG. 19, it is conceived that (S(x0), S(x1), S(x2), and S(x3)) are stored in R0 through R3, and (x4, x5, . . . , and x15) are stored in R4 through R15.

Further, when i=1, as the initial state when starting a round, as previously described, the state in which the (S(p0), S(p1), S(p2), and S(p3)) are stored in R0 through R3, and the (p4, p5, . . . , p15) are stored in R4 through R15 represents the initial state when starting a round.

According to Table 1, FIG. 19 illustrates the content stored in the registers during the calculation of the round function regarding the technique according to the present invention. This represents the content stored in each register R0, R1, . . . , R15 after each cycle in order to execute one round over 16 cycles. Also, as described regarding FIG. 19, the output when (x0, x1, x2, and x3) and (x8, x9, x10, and x11) are input into the F function is designated to be represented as (f0, f1, f2, and f3) and (f8, f9, f10, and f11).

At cycles one through four when executing the round function, the linear conversion unit M801 as described regarding FIG. 18 is executed using a matrix calculation unit M902 as described regarding FIG. 19. Regarding the matrix calculation unit M902, multiplication of 0x02 and 0x03 from a finite GF ($2^8$) with the values stored in R0 and R1 is executed by a mul02 and mul03 described regarding FIG. 19. An XOR is performed on the value from this multiplication, and an XOR is performed also with the values stored in R2 and R3, which is that that is output.

By doing so in this way, the top 8 bits of the output value from the linear conversion unit M801 described regarding FIG. 18 can be calculated during the first round.

Also, bits 9 through 16, 17 through 24, and 25 through 32 of the output value for the linear conversion unit M801 described regarding FIG. 18 can be calculated similarly during the second, third, and fourth cycles by storing the values stored in R0 in R3 at the next cycle by using the multiplexor m03.

This is the matrix conceived, which takes advantage of the point that this is a cyclic matrix which rotates the elements for each line to the right for each line. By conducting an 8-bit rotation of the content stored in (R0, R1, R2, and R3) to the left every cycle, the calculation of each every cycle is implemented using the matrix calculation unit M902 described regarding FIG. 19, which implements the calculation of one matrix line.

Further, at rounds one through four when executing the round function, an XOR calculation is sequentially executed every eight bits from the top eight bits with the round key against the output from the previously described linear calculation unit by an XOR calculation unit X903.

Also, an XOR calculation X191 with the output of an F function F192 described regarding FIG. 20 is achieved by using an XOR calculation unit X904 on the output value from the XOR calculation unit X903 with the round key as in FIG. 19 and the values stored in the register R4.

x4, x5, x6, and x7 are sequentially stored in R4 over cycles one through four, and so by stored the output from the XOR calculation unit X904 in the register R15 using the multiplexor m01, this enables a state in which the values from performing an XOR on the 32-bit output after four cycles when (x0, x1, x2, and x3) was input into the F function and the 32 bits of (x4, x5, x6, and x7) are stored in R12, R13, R14, and R15 every eight bits.

Per the description of Table 1, after four cycles from the start of the round function, the values from the XOR performed on the 32-bit output from when (x0, x1, x2, and x3) were input into the F function and the 32 bits of (x4, x5, x6, and x7) are stored in R12, R13, R14, and R15.

These values are y0, y1, y2, and y3, which are the top 32 bits of the output values from the round function.

Also, the value stored in R0 is stored in R3 at the next cycle using the multiplexor m03 described regarding FIG. 19, and so it can be understood from referring to Table 1 that after four cycles from the start of the round function that the content stored in R0, R1, R2, and R3 have not changed from the values at the start of the round function.

Also, the other x8, x9, . . . , and x15 are stored in R4, R5, . . . , and R11 after four cycles from the start of the round function using the multiplexor m02 described regarding FIG. 19.

Next, the flow of data during cycles five through eight for the execution of the round function will be described. As previously described, it is understood that the calculation using the output from when (x0, x1, x2 and x3) were input into the F function is executable.

However, the values (x0, x1, x2, and x3) necessary as the values for the round function output after four cycles from the start of the round function are not stored, and instead only the (S(x0), S(x1), S(x2), and S(x3)), which are the intermediate values during the calculation of the F function are stored in R0, R1, R2, and R3.

At cycles five through eight, the (x0, x1, x2, and x3) are restored from the intermediate values during the calculation of the F function, which is one point of the present invention, using a circuit for restoring the input for the F function. After four cycles from the start of the round function, the values of (S(x0), S(x1), S(x2), and S(x3)) are stored in R0, R1, R2, and R3 as the intermediate values during the calculation of the F function.

A non-linear calculation unit $S^{-1}$ function S905 described regarding FIG. 19 represents an inverse function of the non-linear calculation unit S-box S901. The values stored in R0 during cycles five through eight from the start of the round function are input into the non-linear calculation unit $S^{-1}$, and this output is stored in R15 using the multiplexor m01.

By doing so in this way, after eight cycles from the start of the round function, this enables a state in which x0, x1, x2, and x3 are stored in R12, R13, R14, and R15. The inverse function $S^{-1}$ of the nonlinear calculation S-box is implemented when configuring a decoding function according to an encryption algorithm using an SPN structure different from that of an expanded Feistel structure, but normally it is not necessary to use this for either encryption or decryption regarding expanded Feistel structures, and so this becomes a circuit for the purpose of restoring the input for the F function from the intermediate values during the calculation of the F function.

Further, at cycles five through eight during the execution of the round function, in order to calculate the output from an F function calculation unit F193 described regarding FIG. 20, the (x8, x9, x10, and x11) stored in R4, R5, R6, and R7 are input into the non-linear calculation unit S901 described regarding FIG. 19, and this output is stored in R0, R1, R2, and R3 using the multiplexor m03.

Per the description of Table 1, after eight cycles from the start of the round function, the values (x0, x1, x2, and x3) are stored in R12, R13, R14, and R15. These values become y12, y13, y14, and y15, which are the bottom 32 bits of the output values from the round function.

Also, the x8, x9, x10, and x11 stored in R4, R5, R6, and R7 after four cycles from the start of the round function are stored in R0, R1, R2, and R3 after eight cycles from the start of the round function and being input into the non-linear calculation unit S901 using the multiplexor m03.

Also, the other x12, x13, x14, x15, y0, y1, y2, and y3 are stored in R4, R5, . . . , and R11 after eight cycles from the start of the round function using the multiplexor m02 described regarding FIG. 19.

Next, the flow of data for cycles nine through twelve during the calculation of the round function will be described. First, the linear conversion unit M801 described regarding FIG. 18 within the F function calculation unit F193 described regarding FIG. 20 is executed using the matrix calculation unit M902 described regarding FIG. 19.

Regarding the matrix calculation unit M902, multiplication of 0x02 and 0x03 from a finite GF ($2^8$) with the values stored in R0 and R1 is executed by a mul02 and mul03 described regarding FIG. 19. An XOR is performed on the value from this multiplication, and an XOR is performed also with the values stored in R2 and R3, the result of which is output.

By doing so in this way, at the ninth cycle from the start of the round function, the top 8 bits of the output value from the linear conversion unit M801 described regarding FIG. 18 can be calculated. Also, bits 9 through 16, 17 through 24, and 25 through 32 of the output value for the linear conversion unit M801 described regarding FIG. 18 can be calculated similarly during the second, third, and fourth cycles by storing the values stored in R0 in R3 at the next cycle by using the multiplexor m03.

Further, at cycles nine through twelve from the start of the round function, an XOR calculation with the round key is sequentially executed every eight bits from the top eight bits against the output from the previously described linear calculation unit by the XOR calculation unit X903. Also, the XOR calculation X191 with the output of an F function F193 described regarding FIG. 20 is achieved by using the XOR calculation unit X904 on the output value from the XOR calculation unit X903 with the round key as in FIG. 19 and the values stored in the register R4.

As x12, x13, x14, and x15 are sequentially stored in R4 during cycles nine through twelve, a state is enabled in which the values from the XOR performed on the 32-bit output from when (x8, x9, x10, and x11) were input into the F function after four cycles and the 32 bits of (x12, x13, x14, and x15) are stored in R12, R13, R14, and R15, by storing the output from the XOR calculation unit X904 in the register R15 using the multiplexor m01.

Per the description of Table 1, after four cycles from the start of the round function, the values from the XOR performed on the 32-bit output from when (x8, x9, x10, and x11) were input into the F function and the 32 bits of (x12, x13, x14, and x15) are stored in R12, R13, R14, and R15.

These values are y8, y9, y10, and y11, which are bits 65 through 96 of the output value from the round function. Also, the value stored in R0 is stored in R3 at the next cycle using the multiplexor m03 described regarding FIG. 19, and so it can be understood from referring to Table 1 that the content stored in R0, R1, R2, and R3 after eight cycles and twelve cycles have not changed.

Also, the other y0, y1, y2, y3, y12, y13, y14, and y15 are stored in R4, R5, . . . , and R11 after 12 cycles from the start of the round function using the multiplexor m02 described regarding FIG. 19.

Next, the flow of data for cycles 13 through 16 during the execution of the round function will be described. As previously described, it is understood that the calculation using the output from when (x8, x9, x10, and x11) were input into the F function is executable.

However, the values (x8, x9, x10, and x11) necessary as the values for the round function output after four cycles from the start of the round function are not stored, and instead only the (S(x8), S(x9), S(x10), and S(x11)), which are the intermediate values during the calculation of the F function are stored in R0, R1, R2, and R3.

At cycles 13 through 16, the (x8, x9, x10, and x11) are restored from the intermediate values during the calculation of the F function, which is one point of the present invention, using a circuit for restoring the input for the F function. After 12 cycles from the start of the round function, the values of (S(x8), S(x9), S(x10), and S(x11)) are stored in R0, R1, R2, and R3 as the intermediate values during the calculation of the F function.

The non-linear calculation unit $S^{-1}$ function S905 described regarding FIG. 19 represents an inverse function of the non-linear calculation unit S-box S901. The values stored in R0 during cycles 13 through 16 from the start of the round function are input into the non-linear calculation unit $S^{-1}$, and this output is stored in R7 using the multiplexor m02.

By doing so in this way, after 16 cycles from the start of the round function, this enables a state in which x8, x9, x10, and x11 are stored in R4, R5, R6, and R7. Further, at cycles 13 through 16 during the execution of the round function, in order to calculate the next F function, the (y0, y1, y2, and y3) stored in R4, R5, R6, and R7 are input into the non-linear calculation unit S901 described regarding FIG. 19, and this output is stored in R0, R1, R2, and R3 using the multiplexor m03.

Per the description of Table 1, after 16 cycles from the start of the round function, the values (x8, x9, x10, and x11) are stored in R4, R5, R6, and R7. These values become y4, y5, y6, and y7, which are the bits 33 through bits 64 of the output values from the round function.

Also, the y0, y1, y2, and y3 stored in R4, R5, R6, and R7 after 12 cycles from the start of the round function are stored in R0, R1, R2, and R3 after 16 cycles from the start of the round function and being input into the non-linear calculation unit S901 using the multiplexor m03.

Also, the other y8, y9, y10, and y11 are stored in R8, R9, R10, and R11, respectively, after 16 cycles from the start of the round function.

Also, the y12, y13, y14, and y15 are stored in R12, R13, R14, and R15, respectively, after 16 cycles from the start of the round function using the multiplexor m01 described regarding FIG. 19.

Lastly, the flow of data for the 16 cycles during the output of ciphertext will be described.

Regarding i∈(0, 1, ..., 15), ci designates 8-bit elements.

At this time, the ciphertext is conceived as the 128 bits represented by (c0, c1, c15).

In R0, R1, ..., R15 described regarding FIG. 19 at the time the round function of r rounds described regarding FIG. 13 finishes, S(c4), S(c5), S(c6), S(c7), c8, c9, c10, c11, c12, c13, c14, c15, c0, c1, c2, and c3 are stored.

Over the 16 cycles during the output of ciphertext, the values stored in R0 are input into the non-linear calculation unit $S^{-1}$ function S905 every cycle, and this output is stored in R15 using the multiplexor m01.

Also, the values stored in R8 are stored in R7 every cycle using the multiplexor m02. Also, the values stored in R4 are input into the non-linear calculation unit S-box S901 every cycle, and this output is stored in R3 using the multiplexor m03. Also, the value in R12 is output from the ciphertext output port as in FIG. 19 every cycle during the output of ciphertext.

By doing so in this way, the C0, c1, ..., and c15 are sequentially output in order every cycle from the ciphertext output port.

As previously described, the non-linear calculation unit $S^{-1}$ function S905 regarding the configuration illustrated in FIG. 19 represents an inverse function of the non-linear calculation unit S-box S901. The non-linear calculation unit $S^{-1}$ function S905 executes a calculation to restore the input for the F function from the intermediate values (intermediate value I804 illustrated in FIG. 18) during the calculation of the F function stored in the registers R0 through R3. The input values corresponding to the round function at the next repetition are executable by this inverse calculation configuration, and so the advantage of reducing registers similar to that previously described can be expected.

4. Summary of the Advantages of the Technique According to the Present Disclosure According to the technique of the related art, the output of the F function has been calculated while the input for the F function continues to be stored. Under the basis of this conception, in addition to the block length worth of registers, registers for storing the intermediate values during the calculation of the F function are necessary.

In contrast, according to the technique related to the present disclosure previously described, a configuration is implemented in which the input for the F function is deleted once, and a circuit is implemented for restoring the original input from the intermediate values during the calculation of the F function, after the calculation of the output of the F function.

By doing so in this way, the necessary registers are just the block length worth of registers, and so it is possible to remove the circuit of registers for storing the intermediate values during the calculation of the F function, which was necessary regarding the technique according to the related art. According the application example of the technique according to the present invention in the previous section, the intermediate value I804 to be stored, which are the values input into the linear conversion unit M802 after the non-linear conversion unit S801 described regarding FIG. 18, is designated as the necessary intermediate values during the calculation of the F function, and thus the output of the F function is executable.

Also, the input for the F function is restored from the intermediate values during the calculation of the F function as previously described by implementing an inverse processing circuit regarding the S-box, which is not used according to the technique of the related art. By doing so in this way, the reduction in registers is achieved as a result. The circuit scale of the registers is relatively large as compared to other cells, and so the reduction of registers had a significant impact on miniaturization.

5. Other Embodiments

According to the previous section, the configuration elements internal to the round function regarding the 4-line expanded Feistel structure were hypothesized to some degree, and the application method and advantages have been described. The technique according to the present disclosure is not only a structure of the specific round function as described by the previous sections, and so modifications and extended structures are also applicable.

Also, the technique according to the present disclosure is not only applicable to 4-line expanded Feistel structures, and so a similar type of conception can be applied to 2-line Feistel structures and x-line expanded structures in which x is any value (x is a natural number of two or more).

5-1. Expanded Example 1

Figure 21:
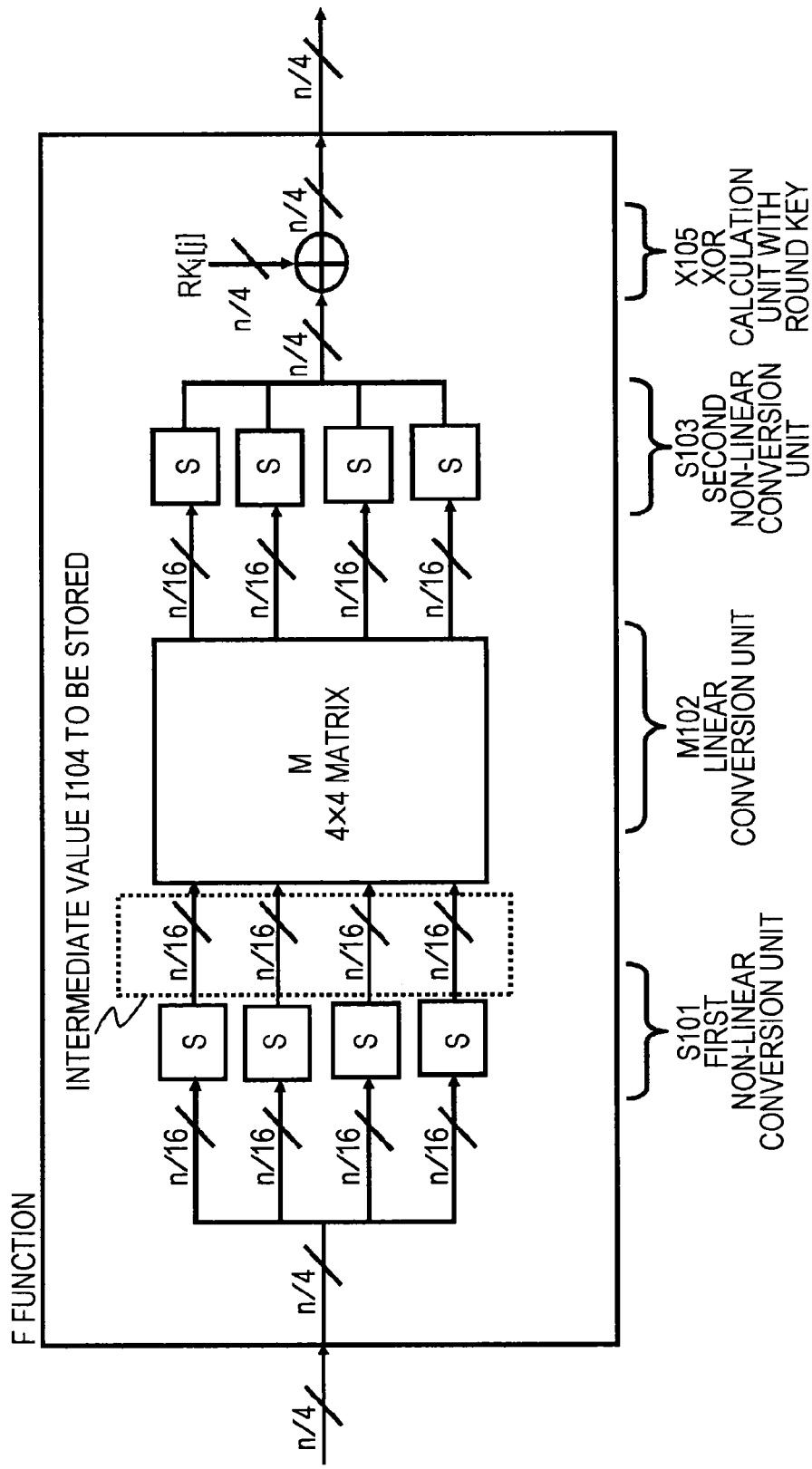
FIG. 21 is a diagram describing an SPS type of F function.
Figure 22:
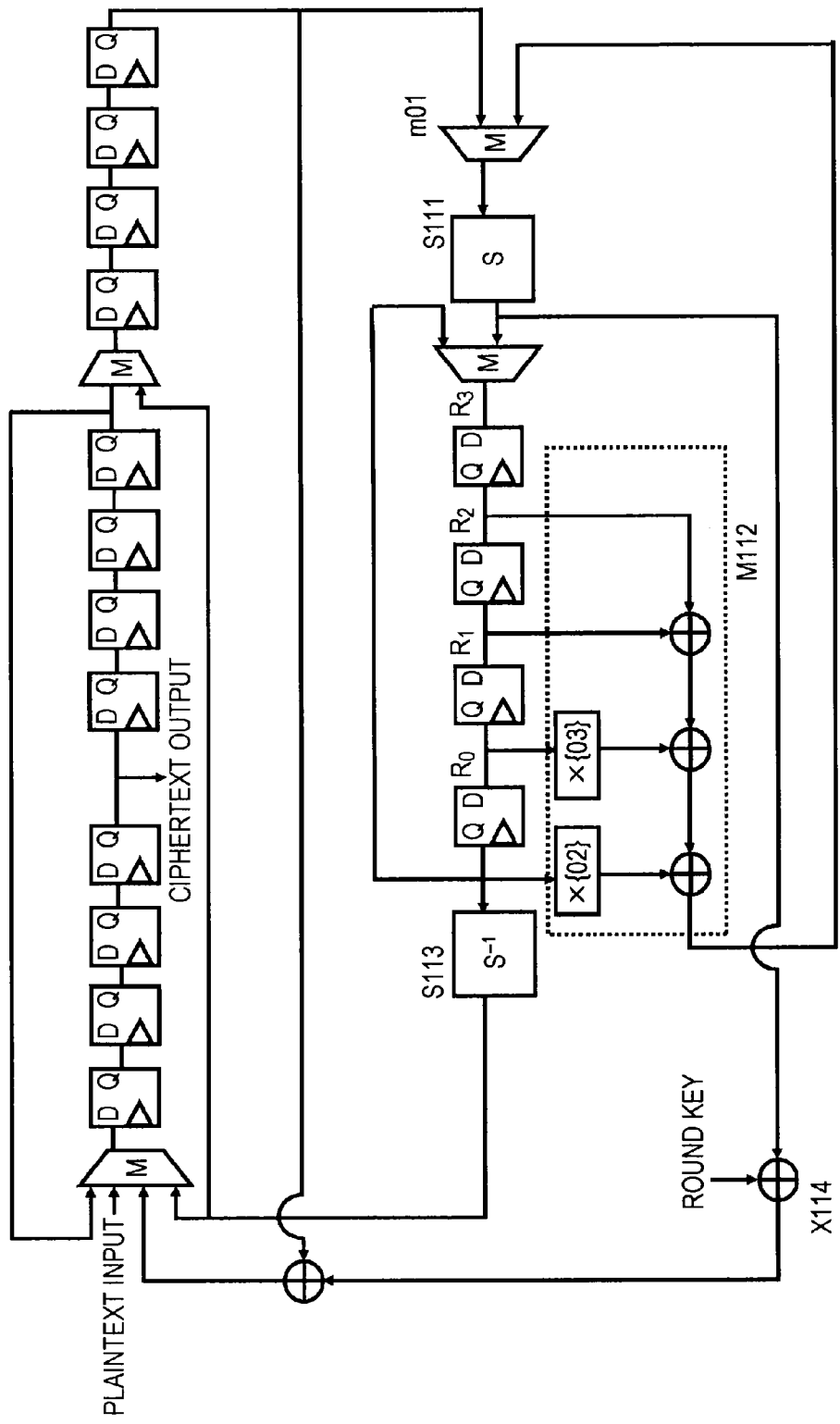
FIG. 22 is a diagram describing an example of a possible data path when applying the method according to the present disclosure to the SPS type of F function disclosed in FIG. 21.

The method according to the present disclosure is not only applicable to the SP type F of function as described regarding FIG. 18, and so is also applicable to SPS type of F functions as described regarding FIG. 21. FIG. 22 illustrates an example data path that can be conceived in this case.

As an example of a matrix, the elements in the first line (2, 3, 1, 1) in FIG. 22 are assumed to be a cyclic matrix. Also, output from a first non-linear calculation unit S101 is input into a linear calculation unit M102 as an example of the intermediate values to be stored, which is a point in the case of applying the technique of the present disclosure to expanded Feistel structures having the F function as described regarding FIG. 21.

FIG. 21 illustrates an intermediate value I104 to be stored.

This case is similar to the flow of data regarding FIG. 19, which is the configuration example of hardware implementation of an expanded Feistel structure having the F function described regarding FIG. 18, and a detailed description will be omitted.

To briefly describe the differences with the data path described regarding FIG. 19, the data path described regarding FIG. 22 is different in that the multiplexor m01 is implemented before the input to a non-linear calculation unit S-box S111, the output from a matrix calculation unit M112 is input into the non-linear calculation unit S-box S111 using the multiplexor m01, and the output from the S-box S111 is directly input into an XOR unit X114 with the round key.

This is due to the point that an SPS type of F function described regarding FIG. 21 is assumed instead of the SP type of F function described regarding FIG. 18. This is because regarding the SPS type of F function described regarding FIG. 21, the output from the linear calculation unit M102 is input into a second non-linear conversion unit S103, and the output from the second non-linear conversion unit S103 is input into an XOR unit X105 with the round key.

A non-linear calculation unit $S^{-1}$ function S113 regarding the configuration illustrated in FIG. 22 represents an inverse function of the non-linear calculation unit S-box S111. The non-linear calculation unit $S^{-1}$ function S113 executes a calculation to restore the input for the F function from the intermediate values (intermediate value I104 illustrated in FIG. 21) during the calculation of the F function stored in the registers R0 through R3. The input values corresponding to the round function at the next repetition are executable by this inverse calculation configuration, and so the advantage of reducing registers similar to that previously described can be expected.

5-2. Expanded Example 2

Figure 23:
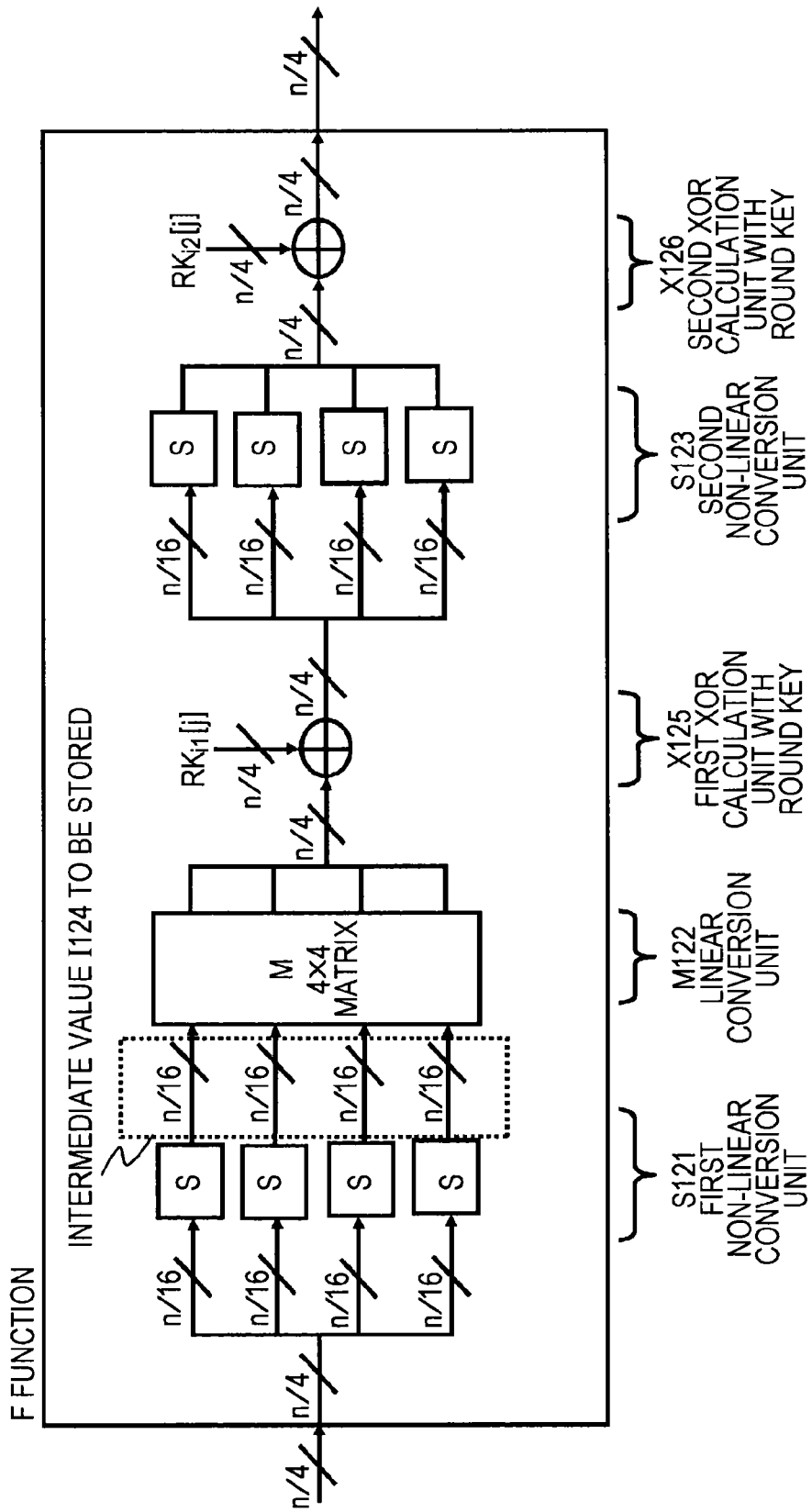
FIG. 23 is a diagram describing the SPS type of F function to which multiple key insertions are input.
Figure 24:
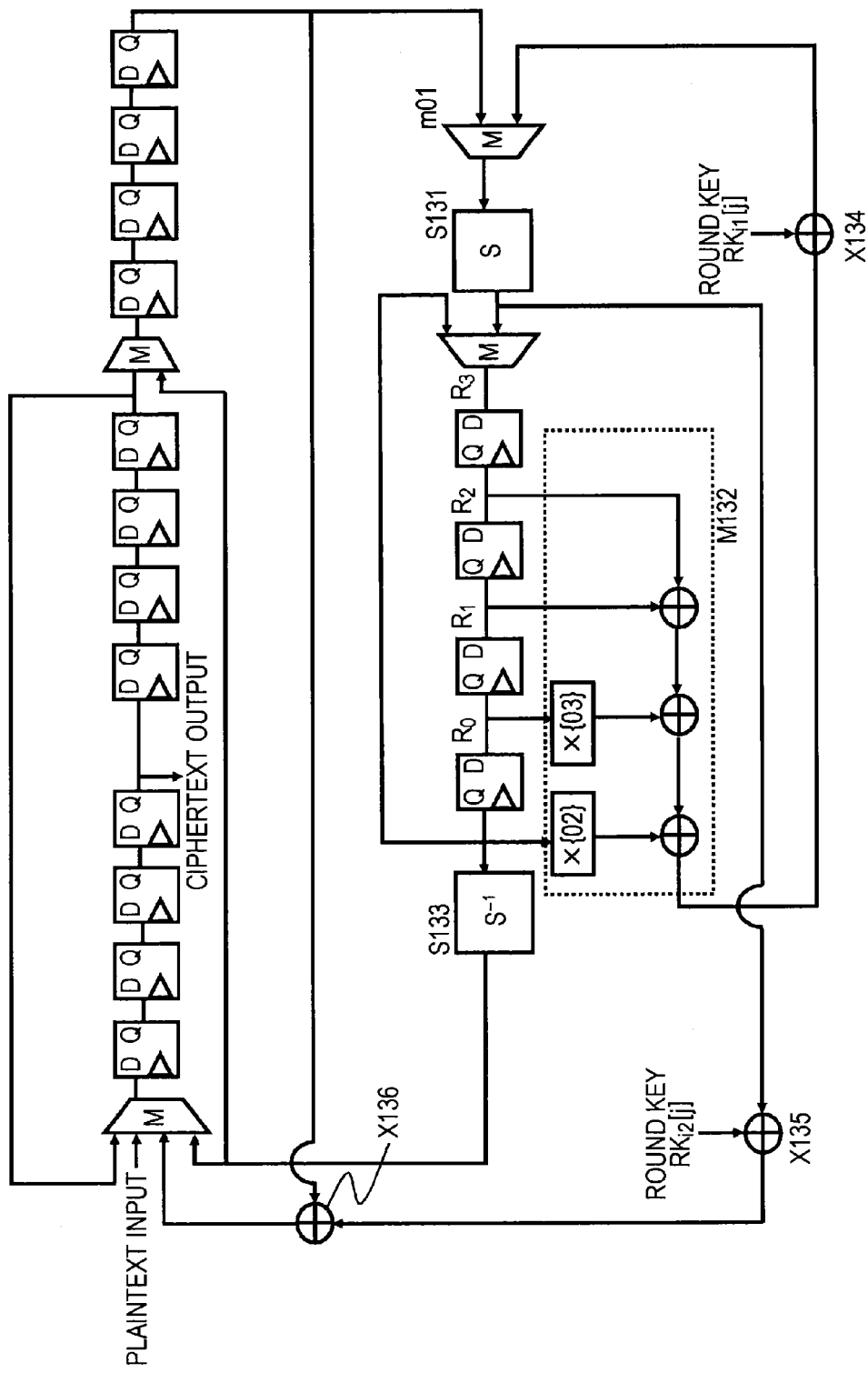
FIG. 24 is a diagram describing an example of a possible data path when applying the method according to the present disclosure to the SPS type of F function disclosed in FIG. 23.

The method according to the present disclosure is not only applicable to the SP type of F function as described regarding FIG. 18, and so is also applicable to SPS type of F functions to which multiple key insertions are input as described regarding FIG. 23. FIG. 24 illustrates an example data path that can be conceived in this case.

As an example of a matrix, the elements in the first line (2, 3, 1, 1) in FIG. 24 are assumed to be a cyclic matrix. Also, output from a first non-linear calculation unit S121 is input into a linear calculation unit M122 as an example of the intermediate values to be stored, which is a point in the case of applying the technique of the present disclosure to expanded Feistel structures having the F function as described regarding FIG. 23.

FIG. 23 illustrates an intermediate value I124 to be stored.

This case is similar to the flow of data regarding FIG. 19, which is the example configuration of a hardware implementation of an expanded Feistel structure having the F function described regarding FIG. 18, and a detailed description will be omitted.

To briefly describe the differences with the data path described regarding FIG. 19, the data path described regarding FIG. 24 is different in that the multiplexor m01 is implemented before the input to a non-linear calculation unit S-box S131, the output from a matrix calculation unit M132 is input into an XOR calculation unit X134, and this output is input into the non-linear calculation unit S-box S131 using the multiplexor m01, and the output from the S-box S131 is directly input into an XOR unit X135 with the round key.

This is due to the point that an SPS type of F function performing multiple key insertions as described regarding FIG. 23 is assumed instead of the SP type of F function described regarding FIG. 18. This is because regarding the SPS type of F function performing multiple key insertions as described regarding FIG. 23, the output from the linear calculation unit M122 is input into a first XOR calculation unit X125 with the round key, the output from the first XOR calculation unit X125 with the round key is input into a second non-linear conversion unit S123, and the output from the second non-linear conversion unit S123 is input into a second XOR unit X126 with the round key.

A non-linear calculation unit $S^{-1}$ function S133 regarding the configuration illustrated in FIG. 24 represents an inverse function of a non-linear calculation unit S-box S131. The non-linear calculation unit $S^{-1}$ function S133 executes a calculation to restore the input for the F function from the intermediate values (intermediate value I124 illustrated in FIG. 23) during the calculation of the F function stored in the registers R0 through R3. The input values corresponding to the round function at the next repetition are executable by this inverse calculation configuration, and so the advantage of reducing registers similar to that previously described can be expected.

5-3. Expanded Example 3

Figure 25:
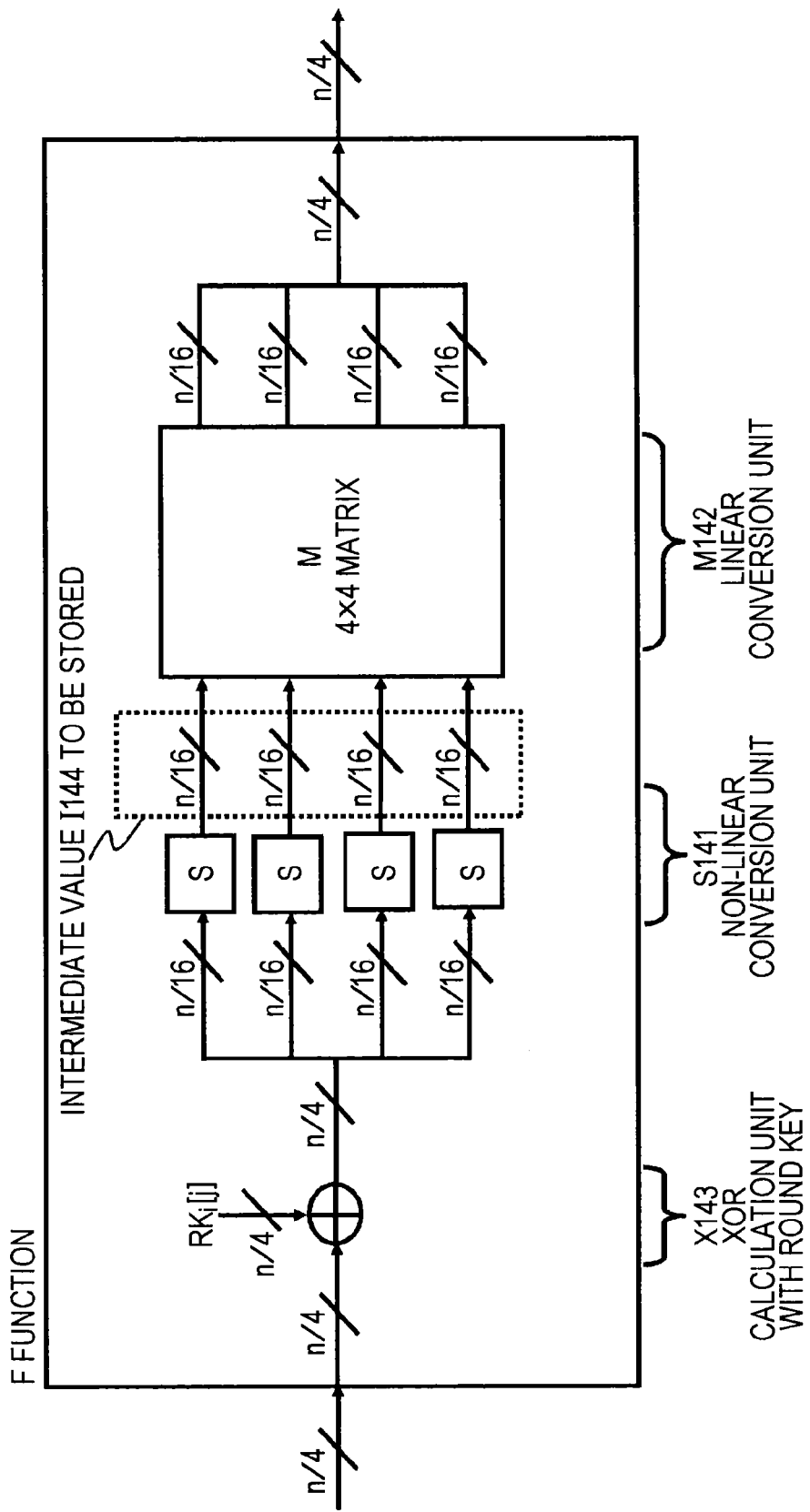
FIG. 25 is a diagram describing an SP type of F function that is immediately after the key insertion is input into the F function.
Figure 26:
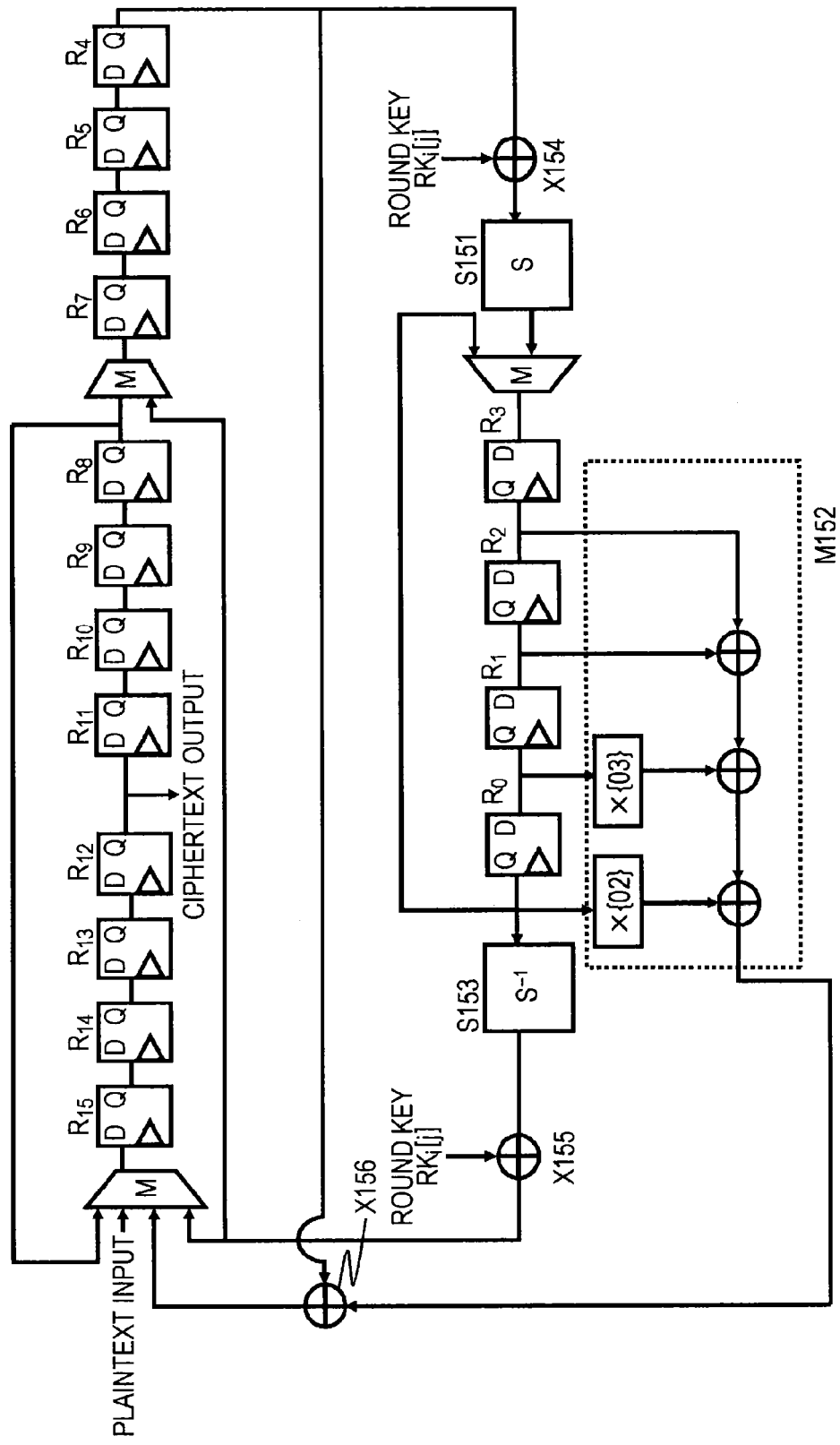
FIG. 26 is a diagram describing an example of a possible data path when applying the method according to the present disclosure to the SP type of F function disclosed in FIG. 25.

The method according to the present disclosure is not only applicable to the SP type of F function as described regarding FIG. 18, and so is also applicable to SP type of F functions in which key insertions are directly after the F function input as described regarding FIG. 25. FIG. 26 illustrates an example data path that can be conceived in this case.

Output from a non-linear calculation unit S141 is input into a linear calculation unit M142 as an example of the intermediate values to be stored, which is a point in the case of applying the technique of the present disclosure to expanded Feistel structures having the F function as described regarding FIG. 25.

FIG. 25 illustrates an intermediate value I144 to be stored.

Different from the F function illustrated in FIG. 18, in order to restore the input for the F function from the intermediate value I144 to be stored described regarding FIG. 25, which are the intermediate values during the calculation of the F function, not only an $S^{-1}$, but also a circuit for performing an XOR with the same round key as when the XOR was performed directly, immediately after the input for the F functions is necessary. This is because not only the inverse calculation of the non-linear calculation unit S141, an inverse calculation by an XOR calculation unit X143 with the round key regarding the values inversely calculated thus is necessary to restore the input for the F function from the intermediate value to be stored described regarding FIG. 25, which is different from the F function illustrated in FIG. 18.

In this case as well, it is conceivable to estimate by considering the flow of data regarding FIG. 19, which is the example configuration of a hardware implementation of an expanded Feistel structure having the F function described regarding FIG. 18, and so a detailed description will be omitted. Regarding the data path described regarding FIG. 26, an XOR calculation unit X154 is implemented before the input for a non-linear calculation unit S-box S151.

In contrast, the output from a matrix calculating unit M152 is directly input into an XOR calculation unit X156 with the value stored in R4 instead of executing the XOR calculation with the round key. Also, the value stored in R0 is input into an XOR calculation unit X155 after being input into the non-linear calculation $S^{-1}$ function, which is also a difference between that regarding FIG. 19. As previously described, this is because not only the inverse calculation of the non-linear calculation unit S141, it is necessary to perform an inverse calculation by the XOR calculation unit X143 with the round key against the values inversely calculated thus in order to restore the input for the F function from the intermediate value I144 to be stored as described regarding FIG. 25.

A non-linear calculation unit $S^{-1}$ function S153 regarding the configuration illustrated in FIG. 26 represents an inverse function of the non-linear calculation unit S-box S151. The non-linear calculation unit $S^{-1}$ function S153 executes a calculation to restore the input for the F function from the intermediate values (intermediate value I144 illustrated in FIG. 25) during the calculation of the F function stored in the registers R0 through R3. The input values corresponding to the round function at the next repetition are executable by this inverse calculation configuration, and so the advantage of reducing registers similar to that previously described can be expected.

5-4. Expanded Example 4

Figure 27:
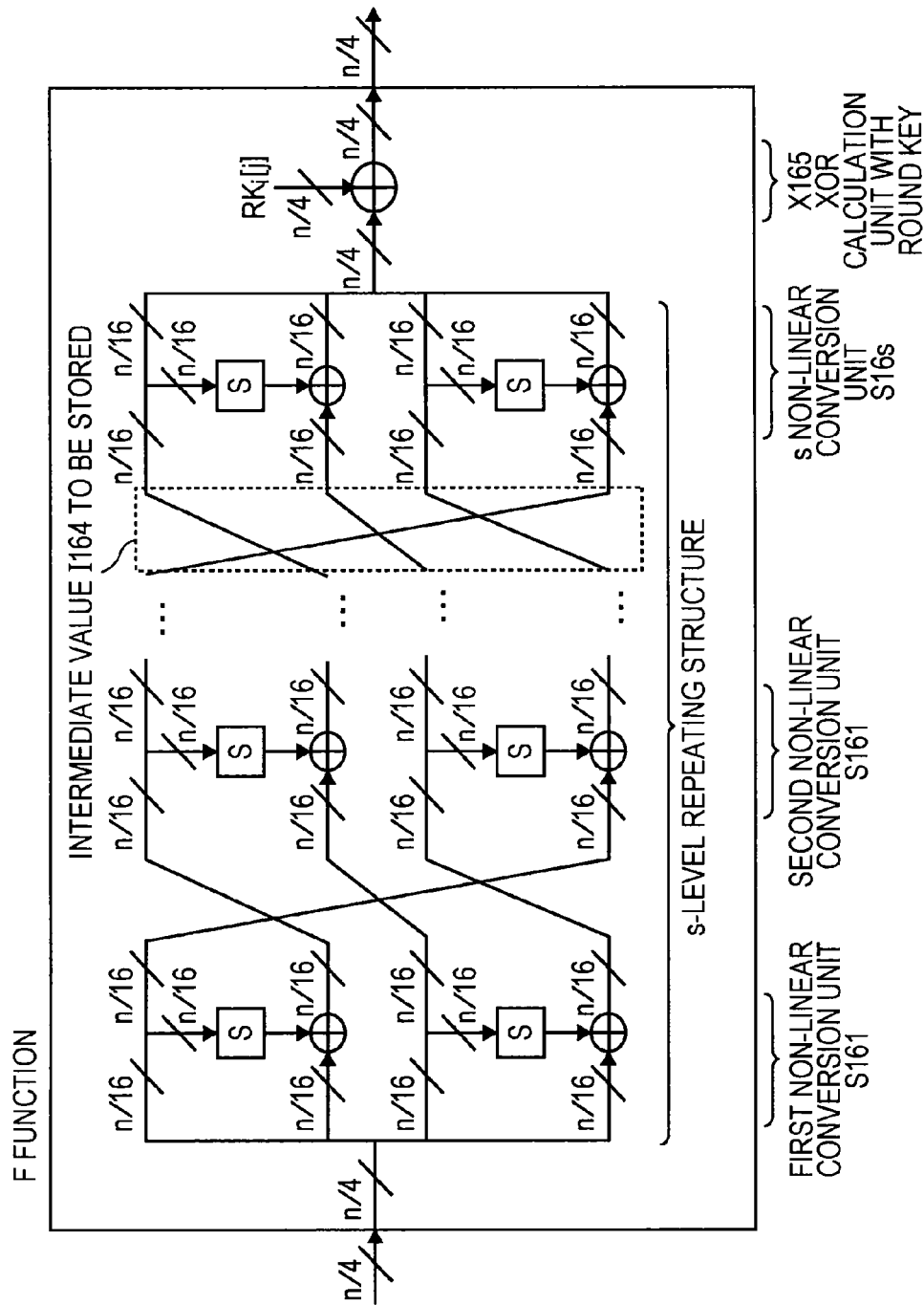
FIG. 27 is a diagram describing an example configuration of an F function.

The method according to the present disclosure is not only applicable to the SP type of F function as described regarding FIG. 18, and so is also applicable to the F functions described regarding FIG. 27. The F function described regarding FIG. 27 has a significantly different structure from the F functions described until this point, and accordingly will be described in detail.

The F function described regarding FIG. 27 calculates the input for the F function by a first non-linear calculation unit S161, and the output from this first non-linear calculation unit S161 is input into a second non-linear calculation unit S162. Afterwards, this structure repeats to form a configuration in which the same calculation as that by the first and second non-linear calculation units is conducted for an s−1 number of times, the output from an s non-linear calculation unit S16s, which performs the calculation finally similar to that by the first and second non-linear calculation units, is input into the XOR calculation unit X105 with the round key, and this output is designated as the output from the F function.

Regarding this kind of F function, registers for storing the value of the intermediate value I164 to be stored described regarding FIG. 27, which are the intermediate values during the calculation of the F function each cycle, are necessary when considering a hardware circuit executing serial processing.

The advantages of the technique according to the invention can also be obtained regarding an encryption algorithm having an expanded Feistel structure storing the F function described regarding FIG. 27. Similar to that introduced by FIG. 18 and FIG. 19, it is possible to restore the input for the F function from the intermediate value I164 to be stored described regarding FIG. 27, and so by implementing a circuit for this purpose, a circuit with just the block length worth of registers can be achieved.

Figure 28:
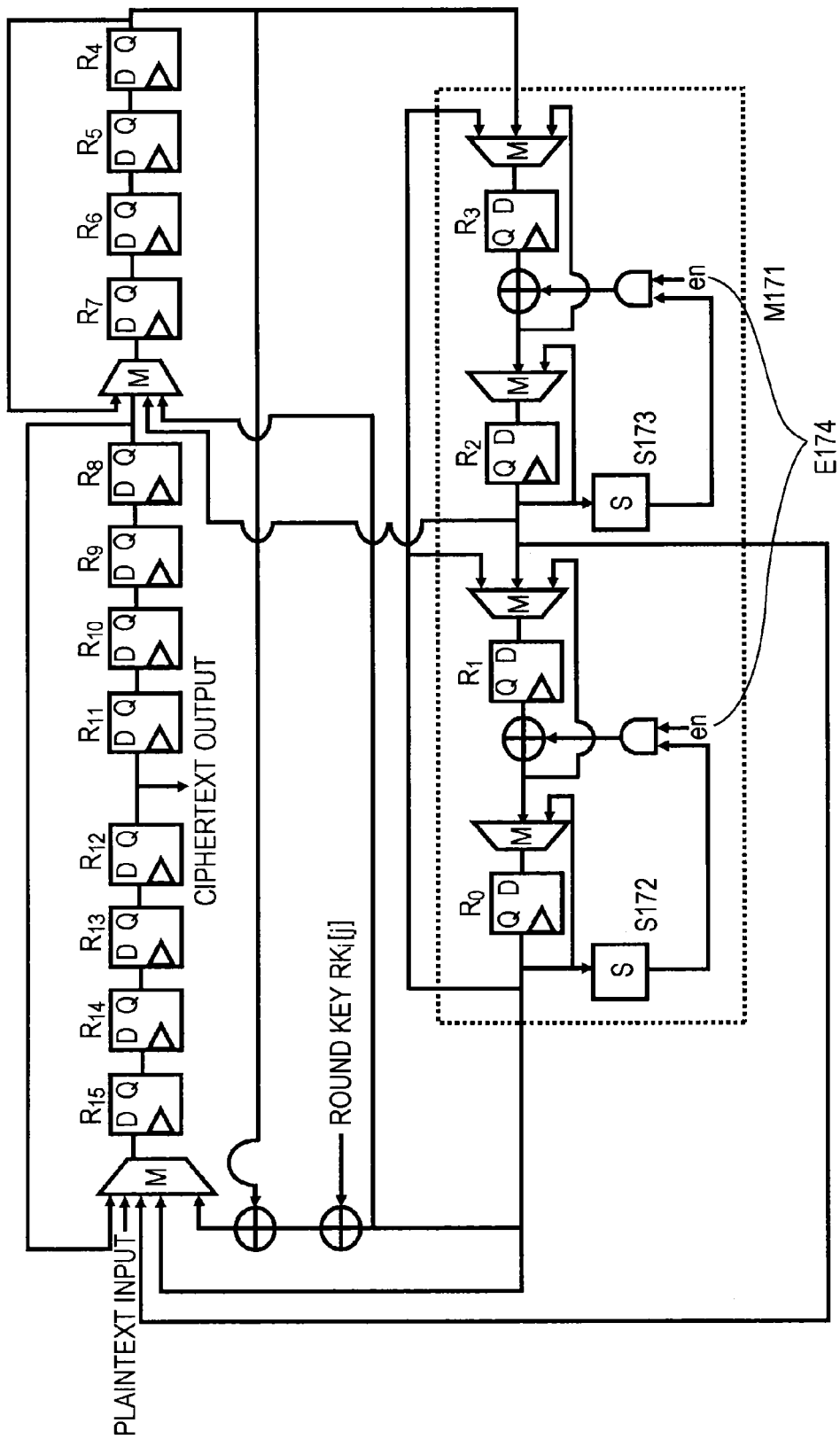
FIG. 28 is a diagram describing an example of a possible data path when applying the method according to the present disclosure to the F function disclosed in FIG. 27.

Within the F function is a repeating structure, and FIG. 28 illustrates an example data path as conceived when s=4. The internal repeating structure of the F function described regarding FIG. 27 is similar to the 4-line expanded Feistel structure, and so from this nature of Feistel structures, the non-linear circuit $S^{-1}$ function is not used, thus it is possible to restore the input for the F function from the intermediate value I164 to be stored described regarding FIG. 27 by using only non-linear calculation units S172 and S173, which are S-box circuits.

Regarding the configuration illustrated in FIG. 28, the non-linear calculation units S172 and S173 execute the calculation to restore the input for the F function from the intermediate values (intermediate value I164 illustrated in FIG. 27) during the calculation of the F function stored in the registers R0 through R3. The input values corresponding to the round function at the next repetition are executable by this calculation configuration, and so the advantage of reducing registers similar to that previously described can be expected.

Also, two S-box circuits are used in the data path described regarding FIG. 28, but it is easy to estimate that it is possible to describe the data path by using only one. Also, though it would be necessary to slightly modify the data path, a data path with an optional number of repetitions is configurable. Also, a control signal E174 represented by a symbol "en" appearing in FIG. 28 represents an enable signal controlled to become high at the necessary timing, which is controlled by a control unit not illustrated in FIG. 28.

5-5. Expanded Example 5

Figure 29:
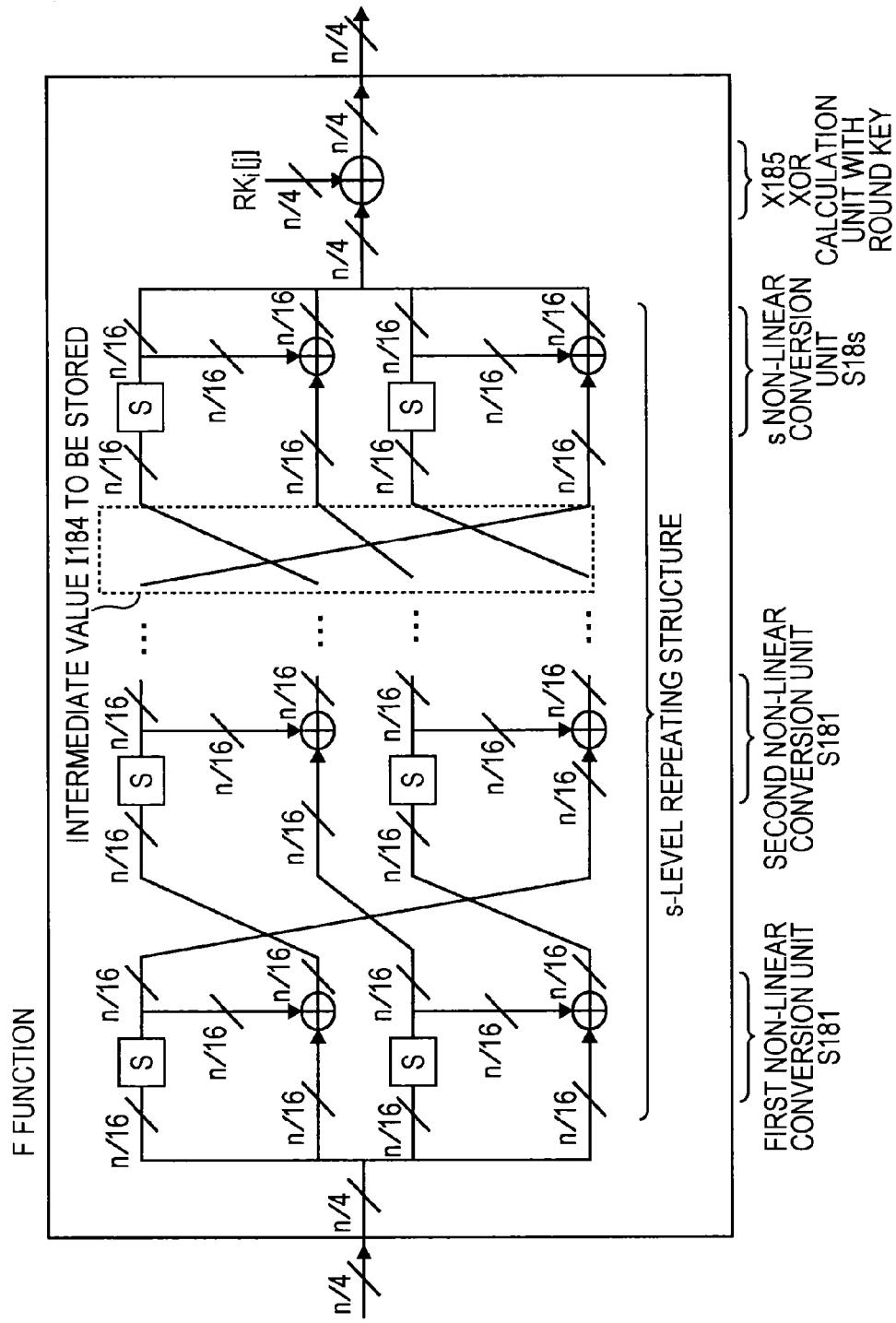
FIG. 29 is a diagram describing a configuration example of an F function.

The method according to the present disclosure is not only applicable to the SP type of F function as described regarding FIG. 18, and so is also applicable to the F functions described regarding FIG. 29. FIG. 29 can be considered as that which has changed the non-linear calculation units S161, S162 and S16s in the repeating type of F function described regarding FIG. 27 to non-linear calculation units S181, S182, and S18s described regarding FIG. 29.

Regarding this kind of F function, registers for storing the value of an intermediate value I184 to be stored described regarding FIG. 29, which are the intermediate values during the calculation of the F function each cycle, are necessary when considering a hardware circuit executing serial processing.

The advantages of the technique according to the invention can also be obtained regarding an encryption algorithm having an expanded Feistel structure storing the F function described regarding FIG. 29. Similar to that described with reference to FIG. 18 and FIG. 19, it is possible to restore the input for the F function from the intermediate value I184 to be stored described regarding FIG. 29, and so by implementing a circuit for this purpose, a circuit with just the block length worth of registers can be achieved.

It is possible to restore the input for the F function from the intermediate value I184 to be stored described regarding FIG. 29 by implementing an $S^{-1}$, which is a circuit for processing an inverse calculation of the S-box, into the structure of the F function. Also, within the F function is a repeating structure, but the technique according to the present invention is applicable to an arbitrary number of repetitions.

5-6. Expanded Example 6

The specific F function configurations described here are limited, but the technique according to the present disclosure is applicable to optional F functions in which it is possible to restore the input for the F function from the intermediate values by implementing an applicable circuit.

5-7. Expanded Example 7

When including a matrix calculation in the F function, the technique according to the present disclosure is not only applicable to cyclic matrixes but also to Hadamard matrices, and a similar advantage can be expected. Also, the idea of the technique according to the present invention can be applied to matrices other than those previously described.

5-8. Expanded Example 8

When including a matrix calculation in the F function, regarding the method according to the present disclosure, a similar conception is applicable to not only 4×4 matrix but also xxx matrices in which x is an arbitrary value (x is a natural number of two or more), and a similar advantage can be expected.

5-9. Expanded Example 9

The application examples of the technique according to the present disclosure described examples with 4-line, type-2 expanded Feistel structures, but this is also applicable to type-1 and type-3 expanded Feistel structures, and a similar advantage can be expected.

5-10. Expanded Example 10

The application examples of the technique according to the present disclosure described examples with 4-line, type-2 expanded Feistel structures, but this is also applicable to 2-line Feistel structures, and a similar advantage can be expected.

5-11. Expanded Example 11

With a conception similar to that applied to the 4-line expanded Feistel structures, this is also applicable to x-line expanded Feistel structures in which x is an arbitrary value (x is a natural number of three or more), and a similar advantage can be expected.

5-12. Expanded Example 12

As illustrated by the dotted frames in FIG. 20, a shuffling processing such as shift processing in data units of each line is performed on the output from one round function when outputting this to the round function for the next repetition.

The shuffling of data between these round functions, that is to say, when the output from the previous round is output to the next round, the processing to shuffle the data by units of each line is called a round permutation.

For example, the round permutation in the 4-line expanded Feistel structure illustrated in FIG. 20 has the following configuration.

The output from the first line from the left is set to the input for the fourth line from the left in the next round function, the output from the second line from the left is set to the input for the first line from the left in the next round function, the output from the third line from the left is set to the input for the second line from the left in the next round function, the output from the fourth line from the left is set to the input for the third line from the left in the next round function, and so this is a setting example of the previously described round permutation.

For example, the data path described with reference to FIG. 19 is an example data path configuration corresponding to the previously described round permutation setting.

The method according to the present disclosure is not limited to the round permutation setting illustrated in FIG. 20, and so an arbitrary round permutation is applicable.

That is to say, by setting an configuration to inversely calculate from intermediate data within the F function execution unit, the advantage to reduce registers similar to that previously described can also be expected regarding configurations having an arbitrary round permutation.

However, it is necessary to set the data path as a configuration depending on the setting of each round permutation.

Figure 30:
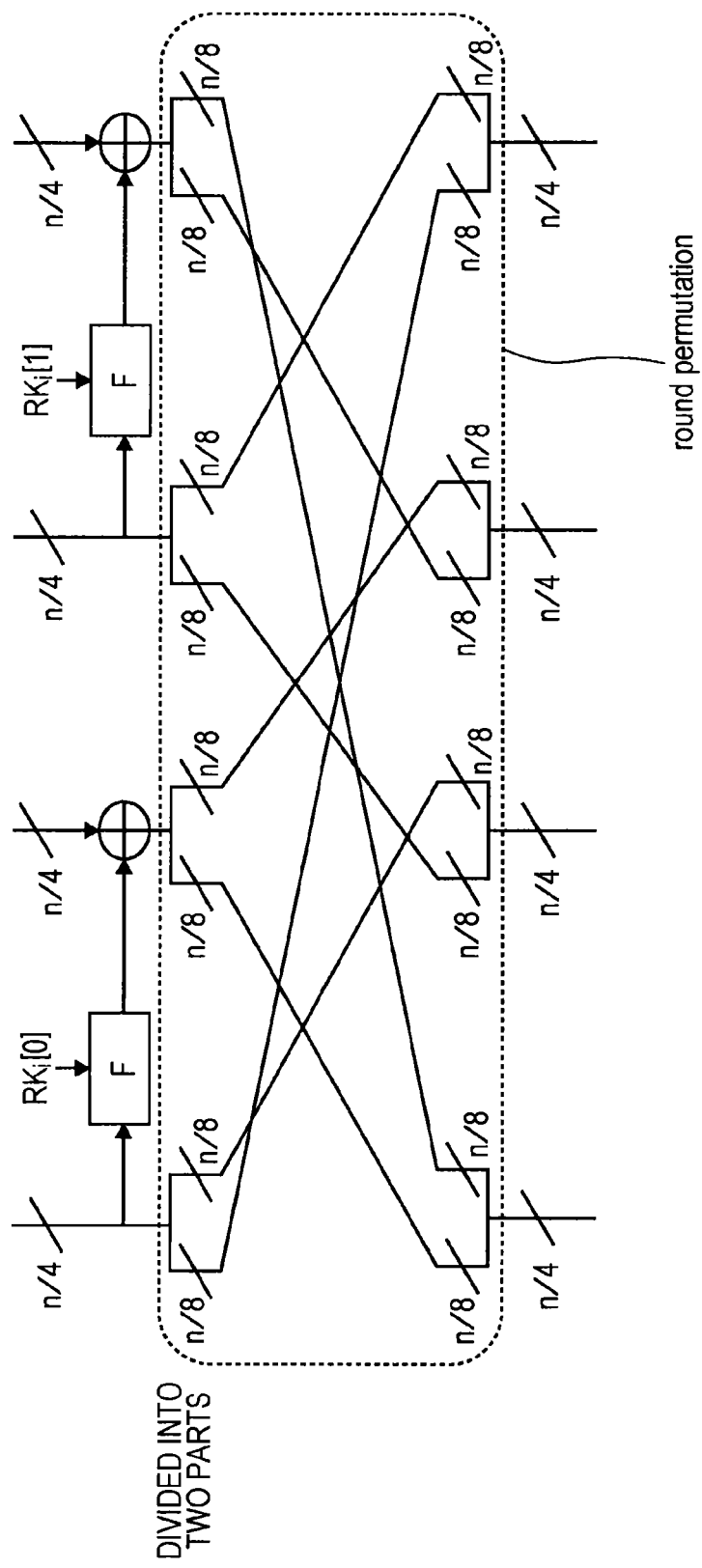
FIG. 30 is a diagram describing a configuration example of one round permutation.

FIG. 30 illustrates one configuration example of a round permutation which is different from the round permutation configuration illustrated in FIG. 20.

The round permutation illustrated in FIG. 30 divides the (n/4)-bit output of each line from the previous round function into two parts, and divides the line output into two parts of (n/8) bits.

This configuration performs data shuffling (replacement) at units of each line when inputting data totaling eight lines including each of the (n/8) bits of data into the next round function.

The setting of the round permutation for the 4-line expanded Feistel structure illustrated in FIG. 30 is as follows.

The first half of the (n/8)-bit data from the output of the first line from the left divided into two parts is set as the input for the first half of the (n/8)-bit data for the fourth line from the left in the next round function, the second half of the (n/8)-bit data from the output of the first line from the left divided into two parts is set as the input for the second half of the (n/8)-bit data for the second line from the left in the next round function, the first half of the (n/8)-bit data from the output of the second line from the left divided into two parts is set as the input for the first half of the (n/8)-bit data for the first line from the left in the next round function, the second half of the (n/8)-bit data from the output of the second line from the left divided into two parts is set as the input for the second half of the (n/8)-bit data for the third line from the left in the next round function, the first half of the (n/8)-bit data from the output of the third line from the left divided into two parts is set as the input for the first half of the (n/8)-bit data for the second line from the left in the next round function, the second half of the (n/8)-bit data from the output of the third line from the left divided into two parts is set as the input for the second half of the (n/8)-bit data for the fourth line from the left in the next round function, the first half of the (n/8)-bit data from the output of the fourth line from the left divided into two parts is set as the input for the first half of the (n/8)-bit data for the third line from the left in the next round function, the second half of the (n/8)-bit data from the output of the fourth line from the left divided into two parts is set as the input for the second half of the (n/8)-bit data for the first line from the left in the next round function, and so this is the setting example of the previously described round permutation.

Further, the F function in the round function illustrated in FIG. 30 is assumed to be an SPS type of F function as described regarding FIG. 21.

Figure 31:
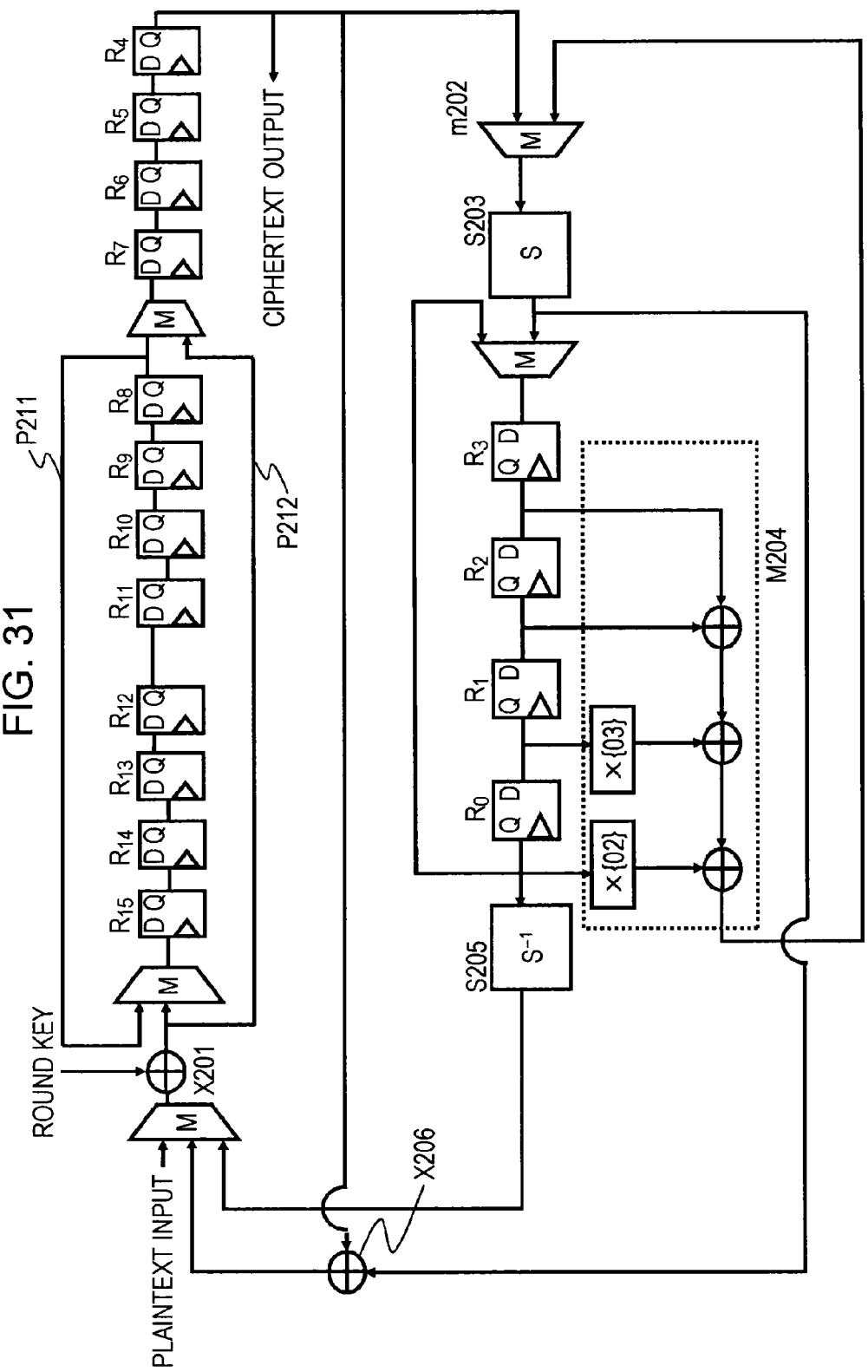
FIG. 31 is a diagram describing an example of a possible data path when applying the method according to the present disclosure to the configuration having a round permutation disclosed in FIG. 30.

FIG. 31 illustrates an example data path of the round function unit regarding the configuration performing the execution of the round permutation illustrated in FIG. 30.

The data path illustrated in FIG. 31 is a configuration example when applying the SPS type of F function described regarding FIG. 21 as the F function. Also, the first line of elements (2, 3, 1, 1) are assumed to be a cyclic matrix as the example of the matrix applied by a matrix calculating unit M204, which is the linear conversion executing unit in the F function.

The intermediate value to be stored in the registers regarding the present configuration example is the output from a first non-linear calculation unit S101 as illustrated in FIG. 21, is the input into a linear calculation unit M102, and is the intermediate value I104 illustrated in FIG. 21.

These intermediate values are stored in registers R0 through R3 regarding FIG. 31.

The basic data flow is similar to the data path illustrated in FIG. 22 as described beforehand regarding the Expanded Example 1, and a multiplexor m202 is set before the input of a non-linear calculation unit S-box S203. The output from the matrix calculating unit M204 is input into the non-linear calculation unit S-box S203 using the multiplexor m202, and the output from the S-box S203 is input an XOR unit X206.

The data path described regarding FIG. 31 is different from the configuration illustrated in FIG. 22 in that it is a configuration in which the output from the S-box S203 is input into the XOR calculation unit X206 before executing the XOR calculation with the round key, and an XOR calculation is executed with the values stored in the register R4. An XOR calculation is performed on this XOR result and the round key at an XOR calculation unit X201.

Also added are a path p211 connecting the register R8 and the register R15, and a path p212 connecting the output from the XOR calculation unit X201 executing the XOR calculation with the round key and the register R7. This is path setting for achieving the round permutation different from that in FIG. 22, that is to say, the round permutation setting illustrated in FIG. 30.

Regarding the data path illustrated in FIG. 31, by setting a configuration to inversely calculate from the intermediate data in the F function execution unit similar to the other embodiments described beforehand regarding FIG. 19 and FIG. 22, that is to say, a non-linear calculation unit $S^{-1}$ function S205, which enables the execution of the input values for the next repetition of the round function, the advantage to reduce registers similar to that previously described can be expected.

6. Configuration Examples of Encryption Processing Device

Finally, embodiments of encryption processing devices executing an encryption processing in accordance with the previously described embodiments will be described.

The encryption processing devices for executing the encryption processing in accordance with the previously described embodiments can be installed in various information processing devices executing encryption processing. Specifically, this can be used regarding various crises in which encryption processing is executed along with data processing and communication processing by devices such as PCs, TVs, recorders, players, communication devices, RFIDs, smart cards, sensor network devices, battery/battery authentication modules, health and medical devices, independent network devices, etc.

Figure 32:
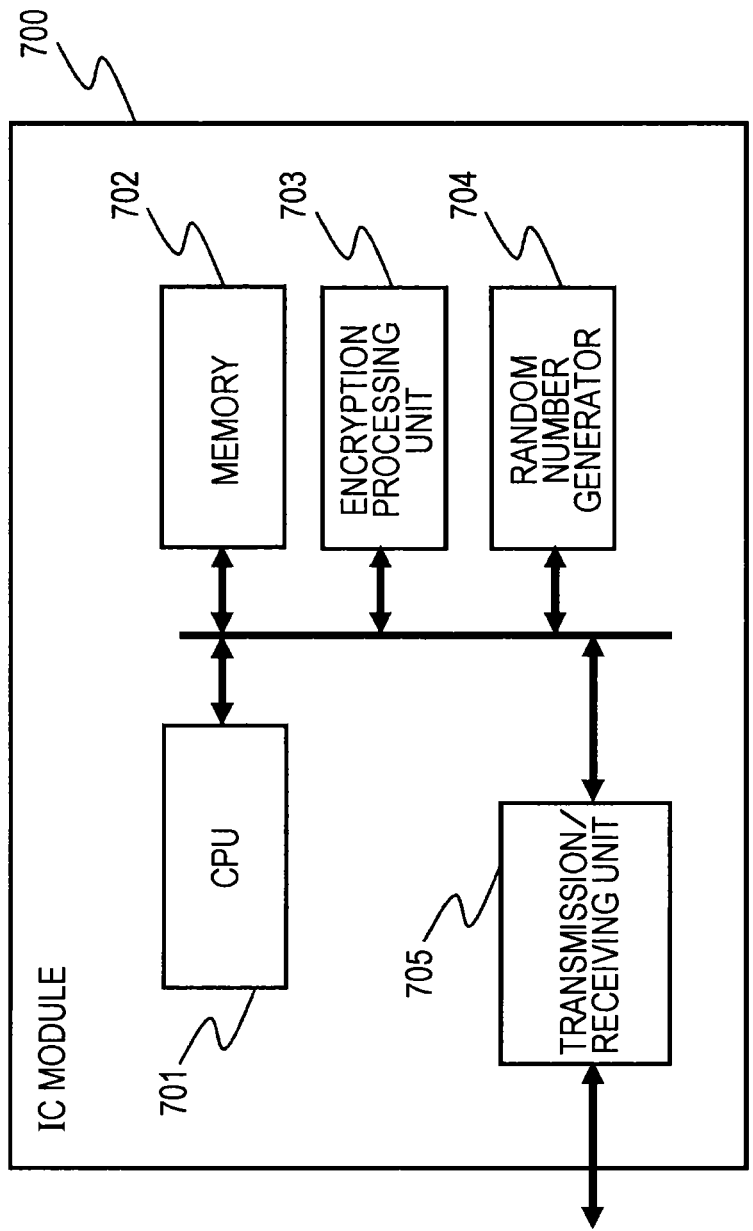
FIG. 32 is a diagram illustrating an example configuration of an IC module 700 as the encryption processing device.

FIG. 32 illustrates an example configuration of an IC module 700 as an example of a device executing the encryption processing according to the present disclosure. The previously described processing can be executed in various information processing devices such as PCs, IC cards, reader-writers, and others, and the IC module 700 illustrated in FIG. 32 can be configured in these various devices.

A CPU (Central Processing Unit) 701 illustrated in FIG. 32 is a processor executing various programs such as the starting and termination of the encryption processing, control of data transmission and reception, data transfer control between each configuration element, and others. A memory 702 is made up from ROM (Read Only Memory) storing fixed data such as the program executed by the CPU 701, calculation parameter, and so on, and RAM (Random Access Memory) used as a work region and storage area of the program executed regarding the processing of the CPU 701 and parameters that arbitrarily change during the processing of the program. Also, the memory 702 can be used as a storage region for data and such applied to conversion matrices and conversion tables (replacement tables) applied during the encryption processing, and for key data necessary during encryption processing. Further, the data storage region is desirably configured as memory having a tamper-resistant structure.

An encryption processing unit 703 executes encryption processing and decryption processing in accordance with the shared key block encryption processing algorithm applying the previously described encryption processing configurations, that is to say for example, expanded Feistel structures or Feistel structures.

Further, examples illustrated here used encryption processing means as individual models, instead of provisioning these kinds of independent encryption processing modules, a configuration can be implemented in which an encryption processing program can be stored in ROM, for example, and the CPU 701 reads out and executes the program stored in ROM.

A random number generator 704 executes random number generation processing necessary during the generation of keys necessary during encryption processing.

A transmission/reception unit 705 is a data communication processing unit executing data communication with external devices, executes data communication with IC modules such as reader-writers, for example, and executes the output of ciphertext generated within the IC module, the input of data from external reader-writers and so on among others.

Further, the encryption processing device described in the previously described embodiments is not only applicable to encryption processing to encrypt plaintext as input data, but is also applicable to decryption processing to decode the ciphertext as input data back to plaintext.

Regarding both processing, the encryption processing and the decryption processing, the configurations of the F function execution unit having a configuration to reduce registers as described in the previous embodiments can be applied as it is.

7. Conclusion of Configuration of the Present Disclosure

Thus, embodiments of the present disclosure have been described in detail with reference to specific embodiments. However, it will be apparent to those skilled in the art that various modifications and substitutions of the embodiments may be made without departing from the scope and spirit of the present disclosure. That is to say, the present invention has been disclosed exemplarily by embodiments, and should not be interpreted restrictively. The Claims should be referenced in order to determine the scope of the present disclosure.

Further, the technologies disclosed in the present specification can take the following configurations.

(1) An encryption processing device including:

an encryption processing unit configured to divide and input configuration bits of data to be data processed into a plurality of lines, and to repeatedly execute data conversion processing of data for each line;

wherein the encryption processing unit includes an F function execution unit to input data from one line configuring the plurality of lines and generate converted data, an XOR calculation unit to execute an XOR calculation with other lines of data corresponding to the output from the F function, an intermediate data storage register to store intermediate data during the process of generating converted data in the F function execution unit, and an inverse calculation executing unit to calculate input data regarding the F function execution unit on the basis of the data stored in the intermediate storage register.

(2) The encryption processing device according to (1), wherein the F function execution unit includes an S-box to execute non-linear conversion processing of input data for the F function execution unit, the intermediate data storage register stores the output value from the S-box as the intermediate data, and the inverse calculation executing unit calculates the input data for the F function execution unit by a calculation processing including an inverse calculation of the non-linear conversion processing via the S-box.

(3) The encryption processing device according to either (1) or (2), wherein the F function execution unit includes a non-linear conversion unit and a linear conversion unit, includes a register to store the output from the non-linear conversion unit as the intermediate data, the linear conversion unit executes linear conversion processing on the values stored in the register, and the inverse calculation unit calculates the input data for the F function by a calculation processing on the values stored in the register.

(4) The encryption processing device according to any one of (1) through (3), wherein the F function execution unit executes non-linear conversion processing in the non-linear conversion unit on input corresponding to the F function execution unit, and further is an SP type of F function to execute the linear conversion processing in the linear conversion unit.

(5) The encryption processing device according to any one of (1) through (4), wherein the F function execution unit executes non-linear conversion processing in the non-linear conversion unit on input corresponding to the F function execution unit, and further is an SPS type of F function to execute the linear conversion processing in the linear conversion unit.

(6) The encryption processing device according to any one of (1) through (5), wherein the F function execution unit includes an XOR calculation unit with the round key input externally.

(7) The encryption processing device according to any one of (1) through (6), wherein the F function execution unit includes a repeating structure of a plurality of non-linear calculation units.

(8) The encryption processing device according to any one of (1) through (7), wherein the encryption processing unit executes encryption processing to convert plaintext as the input data into ciphertext, and executes decryption processing to convert ciphertext as the input data into plaintext.

Further, the processing method executed in the previously described device and system, and the program executing this processing is included in the configuration of the present disclosure.

Also, a portion of the processing described in this specification can be executed as hardware, software, or combination of the two. When executing this processing by software, a program to which the processing sequence is recorded is installed and executed in memory within a computer assembled with specialized hardware, or the program can be installed and executed in a general-purpose computer capable of executing the various processing. For example, the program can be recorded onto a recording medium beforehand. Other than installing to the computer from the recording medium, the program can be received via a network such as a LAN (Local Area Network) or the Internet, and can be installed to a recording medium such as an internal hard disk.

Further, the various processing disclosed in this specification can not only be executed temporally as according to the disclosure, but can also be executed in parallel or individually as necessary or depending on the processing performance of the device executing the processing. Also, the system regarding the present specification is a logical combination configuration of multiple devices, and so each configuration of the devices is not limited to being housed within the same physical unit.

INDUSTRIAL APPLICABILITY

As previously described, according to an embodiment of the present disclosure, miniaturization of the encryption processing configuration is achieved.

Specifically, included is an encryption processing unit configured to divide and input configuration bits of data to be data processed into a plurality of lines, and to repeatedly execute data conversion processing of data for each line, wherein the encryption processing unit includes an F function execution unit to input data from one line configuring the plurality of lines and generate converted data, an XOR calculation unit to execute an XOR calculation with other lines of data corresponding to the output from the F function, an intermediate data storage register to store intermediate data during the process of generating converted data in the F function execution unit, and an inverse calculation executing unit to calculate input data regarding the F function execution unit on the basis of the data stored in the intermediate storage register. The input values for the F function execution unit are calculable by the inverse calculation in the inverse calculation executing unit, which enables a reduction in registers for storing this data, and so miniaturization of the encryption processing configuration is achieved.

REFERENCE SIGNS LIST

700 IC module
701 CPU (Central Processing Unit)
702 memory
703 encryption processing unit
704 random number generator
705 transmission/receiving unit

The invention claimed is:

1. An encryption processing method comprising:
in an encryption processing device with a small circuit scale:
dividing and inputting configuration bits of data to be processed into a plurality of lines, and repeatedly executing data conversion processing of data for each line of the plurality of lines;
executing F function processing of data input from a line of the plurality of lines to an F function and generating converted data using the F function;
executing an XOR calculation with data from another line of the plurality of lines and the converted data;
storing, in a register of the encryption processing device, the data input from the line of the plurality of lines to the F function;
deleting from the register the data input from the line of the plurality of lines to the F function and storing intermediate data during the process of generating the converted data using the F function; and
upon generating the converted data using the F function, restoring in the register, the deleted data input based on the intermediate data generated during the process of generating the converted data and stored in the register.

2. An encryption processing device comprising:
a processor operable to:
- divide and input configuration bits of data to be processed into a plurality of lines, and repeatedly execute data conversion processing of data for each line of the plurality of lines;
- execute F function processing of data input from a line of the plurality of lines to an F function and generate converted data using the F function; and
- execute an XOR calculation with data from another line of the plurality of lines and the converted data; and a register operable to:
- store the data input from the line of the plurality of lines to the F function; and
- delete the data input from the line of the plurality of lines to the F function and store intermediate data during the process of generating the converted data using the F function,
- wherein, upon generating the converted data using the F function, the processor is operable to restore the deleted data input based on the intermediate data generated during the process of generating the converted data and stored in the register.

3. The encryption processing device according to claim 1, wherein the processor is operable to execute S-box processing to execute non-linear conversion processing of data input from the line of the plurality of lines to the F function,
- wherein the register is operable to store an output of the S-box processing as the intermediate data, and
- wherein the processor is operable to restore the deleted data input based on an inverse calculation of the non-linear conversion processing.

4. The encryption processing device according to claim 1, wherein the F function processing includes a linear conversion processing on values stored in the register.

5. The encryption processing device according to claim 4, wherein the F function processing includes non-linear conversion processing on the data input from the line of the plurality of lines to the F function, and wherein the F function is an SP type of F function to execute the linear conversion processing.

6. The encryption processing device according to claim 4, wherein the F function processing includes non-linear conversion processing on the data input from the line of the plurality of lines to the F function, and wherein the F function is an SPS type of F function to execute the linear conversion processing.

7. The encryption processing device according to claim 1, wherein the XOR calculation is executed with a round key input externally.

8. The encryption processing device according to claim 1, wherein the F function processing includes a repetition of a plurality of non-linear calculations.

9. The encryption processing device according to claim 1, wherein the processor is operable to execute encryption processing to convert plaintext as the data to be processed into the plurality of lines into ciphertext, and execute decryption processing to convert ciphertext as the data to be processed into the plurality of lines into plaintext.

10. A non-transitory computer readable medium having stored thereon, a set of computer-executable instructions for causing the computer to perform steps comprising:
in an encryption processing device with a small circuit scale:
- dividing and inputting configuration bits of data to be processed into a plurality of lines, and repeatedly executing data conversion processing of data for each line of the plurality of lines;
- executing F function processing of data input from a line of the plurality of lines to an F function and generating converted data using the F function;
- executing an XOR calculation with data from another line of the plurality of lines and the converted data;
- storing, in a register of the encryption processing device, the data input from the line of the plurality of lines to the F function;
- deleting from the register the stored data input from the line of the plurality of lines to the F function and storing intermediate data during the process of generating the converted data using the F function; and
- upon generating the converted data using the F function, restoring the deleted data input in the register based on the intermediate data generated during the process of generating the converted data.

* * * * *